(12) United States Patent
Yao et al.

(10) Patent No.: US 12,117,344 B2
(45) Date of Patent: Oct. 15, 2024

(54) ON-CHIP POLARIZATION DETECTION AND POLARIMETRIC IMAGING

(71) Applicant: ARIZONA BOARD OF REGENTS ON BEHALF OF ARIZONA STATE UNIVERSITY, Scottsdale, AZ (US)

(72) Inventors: Yu Yao, Chandler, AZ (US); Chao Wang, Chandler, AZ (US); Chu Wang, Mesa, AZ (US); Jing Bai, Tempe, AZ (US); Ali Basiri, Tempe, AZ (US); Xiahui Chen, Mesa, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 257 days.

(21) Appl. No.: 17/743,937

(22) Filed: May 13, 2022

(65) Prior Publication Data

US 2022/0268633 A1    Aug. 25, 2022

Related U.S. Application Data

(63) Continuation of application No. 16/956,988, filed as application No. PCT/US2018/067109 on Dec. 21, 2018, now Pat. No. 11,385,104.

(60) Provisional application No. 62/609,877, filed on Dec. 2, 2017.

(51) Int. Cl.
 *G01J 4/04* (2006.01)
 *G02B 5/30* (2006.01)

(52) U.S. Cl.
 CPC ............... *G01J 4/04* (2013.01); *G02B 5/3025* (2013.01)

(58) Field of Classification Search
 CPC .................................. G01J 4/04; G02B 5/3025
 See application file for complete search history.

(56) References Cited

U.S. PATENT DOCUMENTS

| | | | | |
|---|---|---|---|---|
| 6,563,582 B1* | 5/2003 | Chun | ................... | G02B 5/1814 356/369 |
| 8,835,831 B2* | 9/2014 | Yu | ......................... | H01L 31/105 250/225 |
| 8,835,905 B2* | 9/2014 | Wober | ............... | H01L 27/14643 257/52 |
| 11,487,051 B2* | 11/2022 | Yao | ....................... | G02B 5/3041 |
| 2011/0285942 A1 | 11/2011 | Guo et al. | | |

(Continued)

OTHER PUBLICATIONS

Perkins et al. "Signal-to-noise anaylsis of Stokes parameters in division of focal plane polarimeters," Optics Express, vol. 18, No. 25, Dec. 6, 2010, 10 pages.

(Continued)

*Primary Examiner* — Roy M Punnoose
(74) *Attorney, Agent, or Firm* — MH2 TECHNOLOGY LAW GROUP LLP

(57) ABSTRACT

A method of fabricating a polarization sensor is described. It includes a quarter-wave plate to convert circularly polarized light into linearly polarized light. The quarter-wave plate is realized as a metasurface. The sensor also includes a linear polarizer to analyze the light generated by the quarter wave plate, and a photodetector to receive the analyzed light. The sensor may be combined with other linear polarization sensors to form a sensor capable of complete measurement of the polarization state of incident light.

12 Claims, 15 Drawing Sheets

(56) References Cited

U.S. PATENT DOCUMENTS

| | | | |
|---|---|---|---|
| 2011/0309237 A1* | 12/2011 | Seo | H01L 27/14692 250/208.2 |
| 2011/0309240 A1* | 12/2011 | Yu | H01L 31/022408 257/458 |
| 2014/0346357 A1 | 11/2014 | Jarrahi et al. | |
| 2016/0109630 A1* | 4/2016 | Ichihashi | G02B 5/3025 349/194 |
| 2017/0301819 A1 | 10/2017 | Yao | |
| 2018/0309949 A1* | 10/2018 | Fossum | G02B 5/3058 |
| 2018/0364525 A1 | 12/2018 | Murata et al. | |
| 2021/0190593 A1* | 6/2021 | Yao | G02B 5/3025 |

OTHER PUBLICATIONS

Gruev et al. "CCD polarization imaging sensor with aluminum nanowire optical filters," Optics Express, vol. 18, No. 18, Aug. 30, 2010, 8 pages.

"Bossa Nova Vision, Salsa, Full Stokes polarization camera," 2022 [retreived on Jan. 27, 2022]. Retreived from the internet: <URL: https://www.bossanovavision.com/homepage/polarization-cameras/salsa/>.

Yu, N. et al., Flat optics with designer metasurfaces. Nature Materials 2014, 13, 139.

Zhao, X. et al., Circle polarization shift keying with direct detection for free-space optical communication. Journal of Optical Communications and Networking 2009, 1 (4), 307-312.

Zhao, Y. et al., Chirality detection of enantiomers using twisted optical metamaterials. Nature Communications 2017, 8, 14180.

Zhao, Y. et al., Twisted optical metamaterials for planarized ultrathin broadband circular polarizers. Nature Communications 2012, 3, 870.

Zheng, G. et al., Metasurface holograms reaching 80% efficiency. Nature Nanotechnology 2015, 10, 308.

Bao, Q. Loh, K. P., "Graphene Photonics, Plasmonics, and Broadband Optoelectronic Devices," ACS Nano 6, 3677-3694, (2012).

Kuramochi, H. er al., "Probing the early stages of photoreception in photoactive yellow protein with ultrafast time-domain Raman spectroscopy," Nature Chemistry 9, 660-666, (2017).

He, F. et al., "Femtosecond laser fabrication of monolithically integrated microfluidic sensors in galss," Sensors 14, 19402-19440 (2014).

Brunner, D. er al., "Parallel photonic information processing at gigabyte per second data rates using transient states," Nature Communications 4, 1364, (2013).

Sun et al., "Optiocal modulators with 2D layered materials," Nature Photonics 10, 227-238, (2016).

Gruev et al. "Dual-tier thin film polymer polarization imaging sensor," Optics Express, vol. 18, No. 18, Aug. 30, 2010, 12 pages.

Chen J.-H. et al., "An all-optical modulator based on a stereo graphene-microfiber structure," Light: Science Applications 4, (2015).

Guo, Q. et al., "Universal Near-Infrared and Mid-Infrared Optical Modulation for Ultrafast Pulse Generation Enabled by Colloidal Plasmonic Semiconductor Nanocrystals," ACS Nano 10, 9463-9469, (2016).

Ding, L. et al., "All-Optical Modulation in Chains of Silicon Nanoantennas," ACS Photonics 7, 1001-1008, (2020).

Afinogenov et al., "Ultrafast All-Optical Light Control with Tamm Plasmons in Photonic Nanostructures," ACS Photonics 6, 844-850, (2019).

Shen, L. et al., "Two-photon absorption and all-optical modulation in germanium-on-silicon waveguides for the mid-Infrared," Opt. Lett. 40, 2213-2216, (2015).

Wu, R. et al., "All-Optical Modulation and Ultrafast Switching in MWIR with Sub-Wavelength Structured Silicon," Applied Sciences 9, 1808 (2019).

Yu, J.-P. et al., "Accelerating terahertz all-optical modulation by hot carriers effects of silver nanorods in PVA film," AIP Advances 9, 075017, (2019).

Reed, G. T. et al., "Silicon optical modulatorsm" Nature Photonics 4, 518-526, (2010).

Schönenberger, S. et al., "Ultrafast all-optical modulator with femtojoule absorbed switching energy in silicon-on-insulator," Opt. Express 18, 22485-22496, (2010).

Manolatou, C. et al., "All-optical silicon modulators based on carrier injection by two-photon absorption," Journal of Lightwave Technology 24, 1433-1439, (2006).

Almeida, V. R. et al., "All-optical control of light on a silicon chip," Nature 431, 1081-1084, (2004).

Liu, A. et al., "High-speed optical modulation based on carrier depletion in a silicon waveguide," Opt. Express 15, 660-668 (2007).

Xu, Q. et al., "12.5 Gbit/s carrier-injection-based silicon micro-ring silicon modulators," Opt. Express 15, 430-436, (2007).

Feng, D. et al., "High speed GeSi electro-absorption modulator at 1550 nm wavelength on SOI wavelength," Opt. Express 20, 22224-22232 (2012).

Watts, M. R. et al., Ultralow power silicon microdisk modulators and switches, 2008 5th IEEE international conference on group IV photonics. 4-6 (IEEE).

Baba, T. et al. "Slow-light Mach-Zehnder modulators based on Si photonic crystals, " Science and technology of advanced materials 15, 024602 (2014).

Li, W. et al., "Ultrafast All-Optical Graphene Modulator," Nano Letters 14, 955-959, (2014).

Sun, F. et al., "The all-optical modulator in dielectric-loaded wavelength with graphene-silicone heterojunction structure," Nanotechnology 29, 135201, (2018).

Dash, A. et al., "Enhanced all-optical cavity-tuning using graphene," Opt. Express 27, 34093-34102, (2019).

Sun, F. et al., "An all-optical modulator based on a graphene-plasmonic slot waveguide at 1550 nm," Applied Physics Express 12, 042009, (2019).

Wen, Q-Y. et al., "Graphene based All-Optical Spatial Terahertz Modulator," Scientific Reports 4, 7409, (2014).

Tasolamprou, A. C. et al., "Experimental Demonstration of Ultrafast THz Modulation in a Graphene-Based Thin Film Absorber through Negative Photoinduced Conductivity," ACS Photonics 6, 720-727, (2019).

Yao, Y et al., "Wide Wavelength Tuning of Optical Antennas on Graphene with Nanosecond Response Time," Nano Letters 14, 214-219, (2014).

Yao, Y et al., "Electrically Tunable Metasurface Perfect Absorbers for Ultrathin Mid-Infrared Optical Modulators," Nano Letters 14, 6526-6532, (2014).

Ulstrup, S. et al., "Ultrafast electron dynamics in epitaxial graphene investigated with time-and angle-resolved photoemission spectroscopy," Journal of Physics: Condensed Matter 27, 164206 (2015).

Gierz, I. et al., "Snapshots of non-equilibrium Dirac carrier distributions in graphene," Nature materials 12, 1119-1124 (2013).

Lui, C. H. et al., "Ultrafast Photoluminescence from Graphene," Physical Review Letters 105, 127404, (2010).

Behadur, Birendra. "Liquid Crystal Displays," Molecular Crystals and Liquid Crystals, 1984, 109 (1), pp. 3-93.

Stephens, Philip J. "Vibrational Circular Dichroism Spectroscopy: A New Tool for the Stereochemical Characterization of Chiral Molecules," ChemInform, 2004, 35 (27), pp. 699-725.

Yang et al. "Vibrational Circular Dichroism Spectroscopy of Chiral Molecules," Top Curr Chem, 2011, 298, pp. 189-236.

Flueraru et al. "Error Analysis of a Rotating Quarter-Wave Plate Stokes' Polarimeter," IEEE Transactions on Instrumentation and Measurement, vol. 57, No. 4, Apr. 2008, 5 pages.

Basiri et al. "Nature-inspired chiral metasurfaces for circular polarization detection and full-Stokes polarimetric measurements," Light: Science & Applications Accepted, 2019, 11 pages.

Christian et al. "Probabilistic Analysis to Quantify Optical Performance and Error Budgets for Next Generation Heliostats," Journal of Solar Energy Engineering, vol. 137, Jun. 2015, 8 pages.

Collado F.J. "Preliminary design of surrounding heliostat fields", Renewable Energy, vol. 34, No. 5., May 1, 2009, p. 1359-1363.

Noone et al. "Heliostat field optimization: A new computationally efficient model and biomimetic layout," Solar Energy, vol. 86, 2012, 86, pp. 792-803.

(56) References Cited

OTHER PUBLICATIONS

Eddhibi et al. "Optical study of solar tower power plants," J. Phys.: Conf. Ser. 596, 2015, 8 pages.
Kistler, B. L. "A User's Manual for DELSOL3: A Computer Code for Calculating the Optical Performance and Optimal System Design for Solar Thermal Central Receiver Plants," Sandia National Laboratories, Sandia Report No. SAND 86-8018, 1986, 239 pages.
Gurton et al. "Measured Degree of Infrared Polarization for a Variety of Thermal Emitting Surfaces," Army Research Laboratory, Adelphi, MD, Jun. 2004, 34 pages.
Hu et al. Polarization: Measurement, Analysis, and Remote Sensing XIII, Jun. 21, 2018, full document. *** Don Avery said this is a book so not to ignore this one.
Basiri et al. "Ultrafast Mid-Infrared Optical Modulator Based On Optically Controlled Graphene-Integrated Metasurface," Optica Publishing Group, 2020, 2 pages.
Afshinmanesh, F. et al., Measurement of the polarization state of light using an integrated plasmonic polarimeter, Nanophotonics 2012, 1, (2), 125-129.
Arbabi, E. et al., Full-Stokes Imaging Polarimetry Using Dielectric Metasurfaces. ACS Photonics 2018, 5 (8), 3132-3140.
Balthasar Mueller, J. P. et al., Ultracompact metasurface in-line polarimeter. Optica 2016, 3 (1), 42-47.
Bassan, P. et al., Large scale infrared imaging of tissue micro arrays (TMAs) using a tunable Quantum Cascade Laser (QCL) based microscope. Analyst 2014, 139 (16), 3856-3859.
Chen, W. T. et al., Integrated plasmonic metasurfaces for spectropolarimetry. Nanotechnology 2016, 27 (22), 224002.
Dong, J. et al., Bi-layer cross chiral structure with strong optical activity and negative refractive index. Opt. Express 2009, 17 (16), 14172-14179.
Frank, B. et al., Large-Area 3D Chiral Plasmonic Structures. ACS Nano 2013, 7 (7), 6321-6329.
Fukuda, H. et al., Silicon photonic circuit with polarization diversity. Opt. Express 2008, 16 (7), 4872-4880.
Gansel, J. K. et al., Gold Helix Photonic Metamaterial as Broadband Circular Polarizer. Science 2009, 325 (5947), 1513-1515.
Garcia, N. M. et al., Surface normal reconstruction using circularly polarized light, Opt Express 2015, 23, (11), 14391-14406.
Gruev, V. et al., CCD polarization imaging sensor with aluminum nanowire optical filters. Opt. Express 2010, 18 (18), 19087-19094.
Guo, B. et al., Laser-based mid-infrared reflectance imaging of biological tissues. Opt. Express 2004, 12 (1), 208-219.
Gurton, K.P. et al., Enhanced facial recognition for thermal imagery using polarimetric imaging. 2014; vol. 39, p. 3857-3859.
Hou-Tong, C. et al., Reports on Progress in Physics 2016, 79, (7), 076401.
Hu, J. et al., All-dielectric metasurface circular dichroism waveplate. Scientific Reports 2017, 7, 41893.
Ichimoto, K. et al., Polarization Calibration of the Solar Optical Telescope onboard Hinode. In The Hinode Mission, Sakurai, T., Ed. Springer New York: New York, NY, 2008; pp. 179-207.
Jin, L. et al., Noninterleaved Metasurface for (26-1) Spin- and Wavelength-Encoded Holograms. Nano Letters 2018, 18 (12), 8016-8024.
Kats, M. A. et al., Thin-Film Interference in Lossy, Ultra-Thin Layers. Opt. Photon. News 2014, 25 (1), 40-47.
Khorasaninejad, M. et al., Metalenses at visible wavelengths: Diffraction-limited focusing and subwavelength resolution maging, Science 2016, 352, (6290), 1190-1194.
Kikuta et al., "Achromatic quarter-wave plates using the dispersion of form birefringence," Applied Optics, vol. 36, Issue 7, Mar. 1, 1997, pp. 1566-1572.
Kunnen, B. et al., Application of circularly polarized light for non-invasive diagnosis of cancerous tissues and turbid issue-like scattering media. Journal of Biophotonics 2015, 8 (4), 317-323.
Lee, K. et al., Ultracompact Broadband Plasmonic Polarimeter. Laser Photonics Reviews 2018, 12 (3), 1700297.
Li, W. et al., Circularly polarized light detection with hot electrons in chiral plasmonic metamaterials. Nat Commun 2015, 6, 8379.
Li, Z. S. et al., Detection of methane with mid-infrared polarization spectroscopy. Applied Physics B 2004, 79 (2), 135-138.
Liang, G. et al., Monolithic Semiconductor Lasers with Dynamically Tunable Linear-to-Circular Polarization. ACS Photonics 2017, 4 (3), 517-524.
Lueder, E., "Electro-optic Effects in Twisted Nematic Liquid Crystals," Liquid Crystal Displays : Addressing Schemes and Electro-Optical Effects, John Wiley Sons, Incorporated, 2010.
Zhu, A. Y. et al., Giant intrinsic chiro-optical activity in planar dielectric nanostructures. Light: Science Applications 2018, 7, 17158.
Nordin et al., "Broadband form birefringent quarter-wave plate for the mid-infrared wavelength region," Optics Express, vol. 5, No. 88, Oct. 11, 1999, pp. 163-169.
PCT Written Opinion of the International Searching Authority and International Search Report mailed Jun. 20, 2019 in corresponding PCT Application No. PCT/US2018/067109, 11 pages.
Sato et al., "Compact ellipsometer employing a static polarimeter module with arrayed polarizer and wave-plate elements," Applied Optics, vol. 46, No. 22, Jul. 6, 2007.
Zhao et al., "Manipulating light polarization with ultrathin plasmonic metasurfaces," Physical Review, B 84 205428, Nov. 16, 2011.
Martinez, N. J. et al., Single photon detection in a waveguide-coupled Ge-on-Si lateral avalanche photodiode Opt Express 2017, 25, (14), 16130-16139.
Nafie, L.A. et al., "Vibrational circular dichroism," Journal of the American Chemical Society, vol. 98, pp. 2715-2723, doi:10.1021/ja00426a007 (1976).
Patel, R. et al., Polarization-Sensitive Multimodal Imaging for Detecting Breast Cancer. Cancer Research 2014, 74 (17), 4685-4693.
Pfeiffer, C. et al., Bianisotropic Metasurfaces for Optimal Polarization Control: Analysis and Synthesis. Phys Rev Appl 2014, 2 (4).
Pors, A. et al., Plasmonic metagratings for simultaneous determination of Stokes parameters. Optica 2015, 2 (8), 716-723.
Roberts, K. et al., Performance of Dual-Polarization QPSK for Optical Transport Systems. Journal of Lightwave Technology 2009, 27 (16), 3546-3559.
Rubin, N. A. et al., "Matrix Fourier optics enables a compact full-Stokes polarization camera," Research Article, Science, 2019, vol. 365, No. 43, Issue 6448, 10 pages.
Rubin, N. A. et al., Polarization state generation and measurement with a single metasurface. Opt. Express 2018, 26 (17), 21455-21478.
Salomatina-Motts, E. et al., Multimodal polarization system for imaging skin cancer. Optics and Spectroscopy 2009, 107 (6), 884-890.
Schaefer, B. et al., Measuring the Stokes polarization parameters. American Journal of Physics 2007, 75 (2), 163-168.
Short, N. et al., Improving cross-modal face recognition using polarimetric imaging. Opt Lett 2015, 40 (6), 882-885.
Tamura, M. et al., First Two-Micron Imaging Polarimetry of B Pictoris, The Astrophysical Journal, 2006, 641: 1172-1177.
Tang, Y. et al., A. E., Enhanced Enantioselectivity in Excitation of Chiral Molecules by Superchiral Light. Science 2011, 332 (6027), 333-336.
Tyo, J. S. et al., Review of passive imaging polarimetry for remote sensing applications. Appl. Opt. 2006, 45 (22), 5453-5469.
Whitmore, L. et al., Protein secondary structure analyses from circular dichroism spectroscopy: Methods and reference databases. Biopolymers 2008, 89 (5), 392-400.
Wu, P. C. et al., Versatile Polarization Generation with an Aluminum Plasmonic Metasurface. Nano Letters 2017, 17 (1), 445-452.
Yang, Z. et al., Generalized Hartmann-Shack array of dielectric metalens sub-arrays for polarimetric beam profiling. Nature Communications 2018, 9 (1), 4607.
Yeh, P., "Electromagnetic Propagation in Birefringent Layered Media," J Opt Soc Am, 1979, vol. 69, No. 5, pp. 742-756.
Yu, N. et al., A Broadband, Background-Free Quarter-Wave Plate Based on Plasmonic Metasurfaces. Nano Letters 2012, 12 (12), 6328-6333.

* cited by examiner

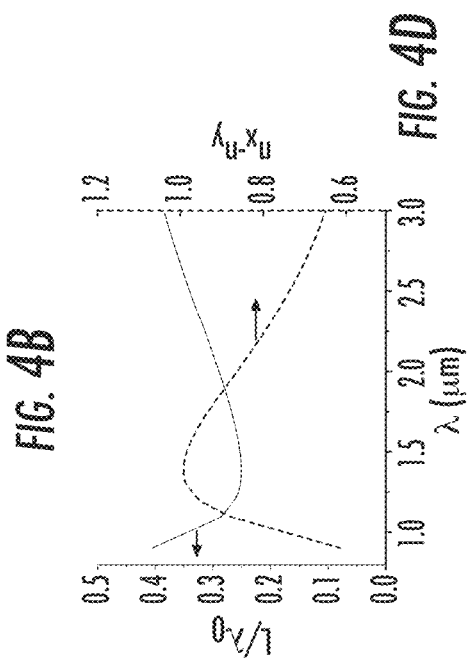
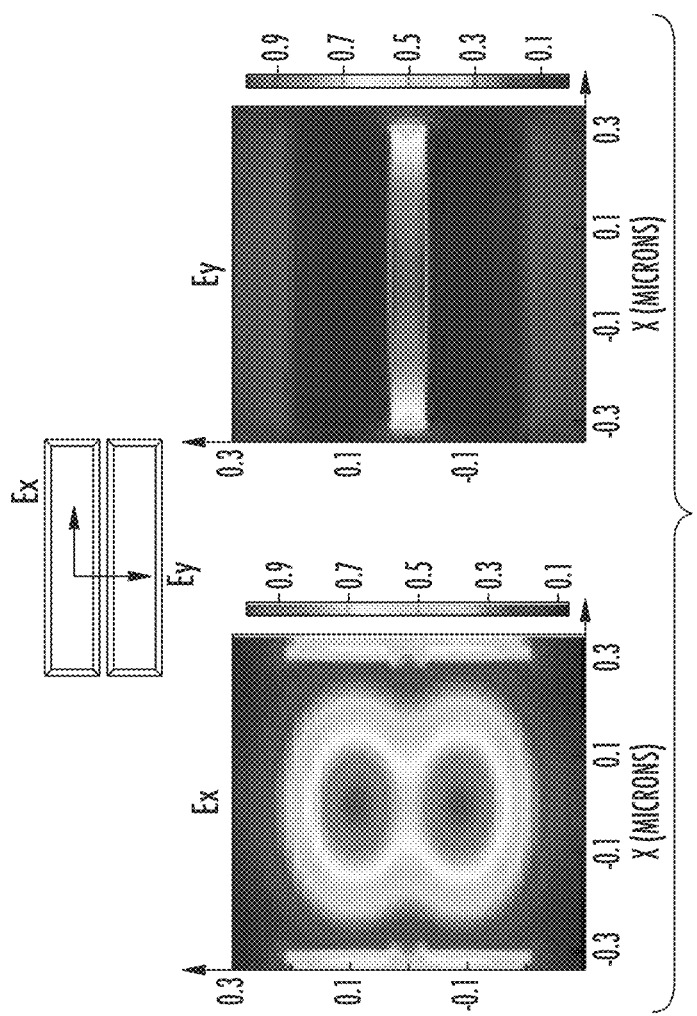
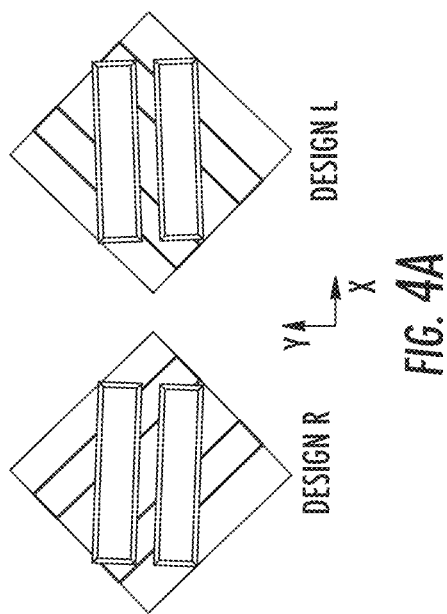
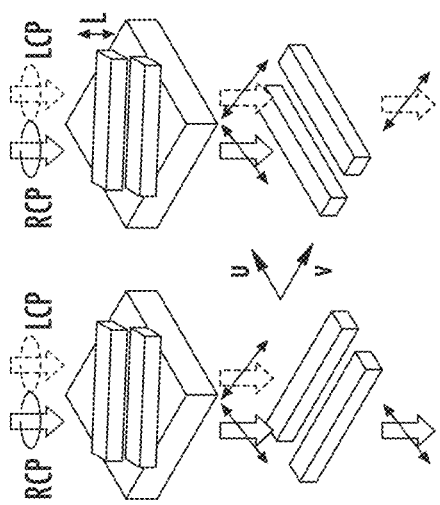
FIG. 4A
FIG. 4B
FIG. 4C
FIG. 4D

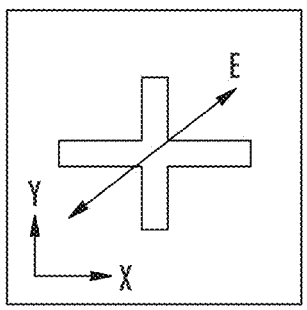
*FIG. 6A*
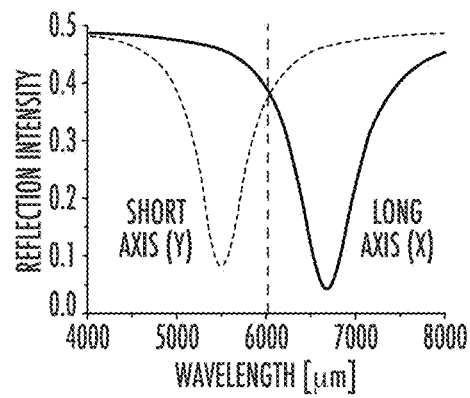
*FIG. 6B*
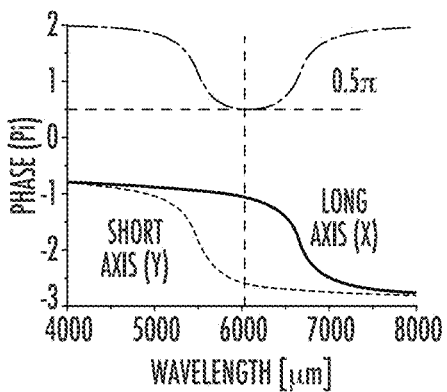
*FIG. 6C*
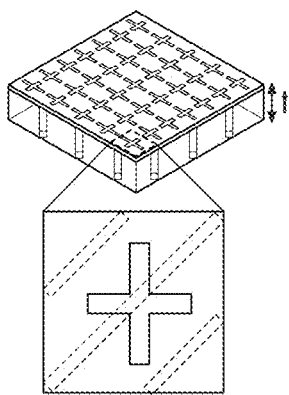
*FIG. 7A*
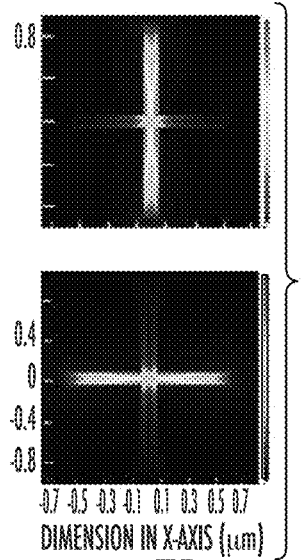
*FIG. 7B*
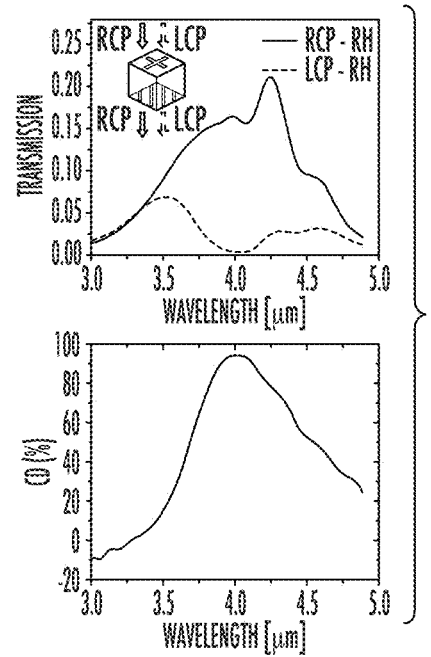
*FIG. 7D*
*FIG. 7E*
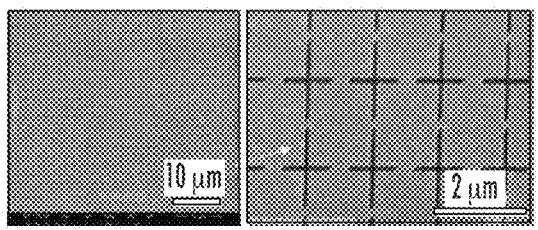
*FIG. 7C*

FABRICATION OF POLARIZATION DETECTORS

- (1) DIELECTRIC LAYER DEPOSITON (e.g. SiO2).
- (2) FABRICATION OF Ag NANO-GRATINGS USING EBL OR NANOIMPRINT
- (3) DEPOSITION OF $SiO_2$ USING RF SPUTTERING
- (4) FABRICATION OF Ag CROSS-SHAPE OPTICAL ANTENNA ARRAYS USING EBL OR NANOIMPRINT

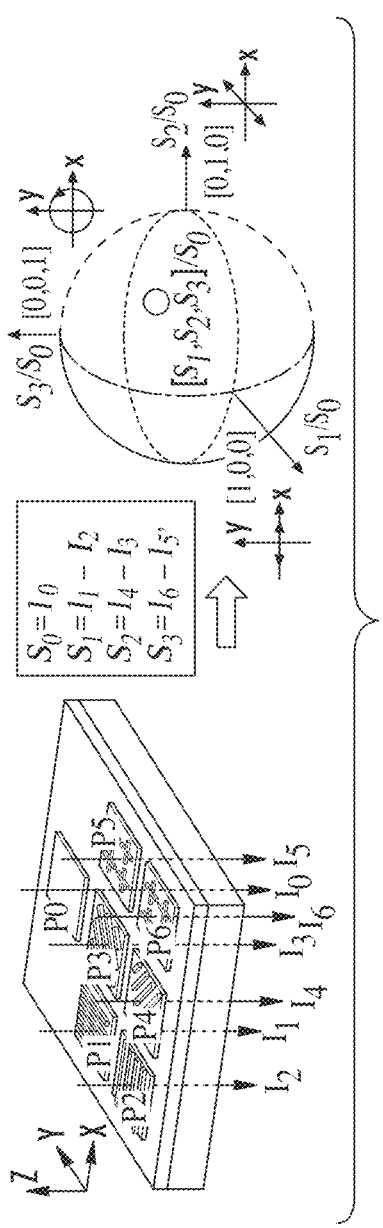
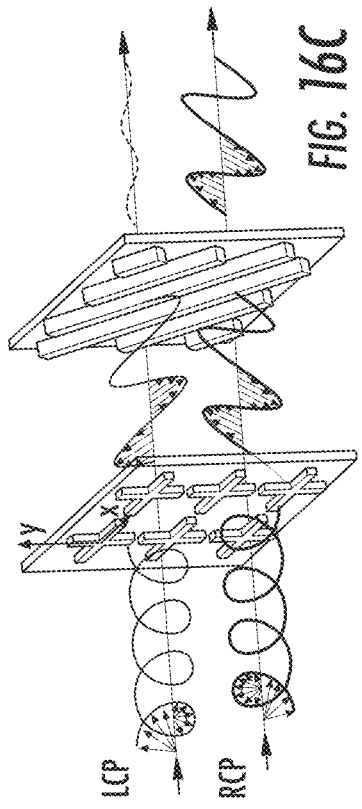
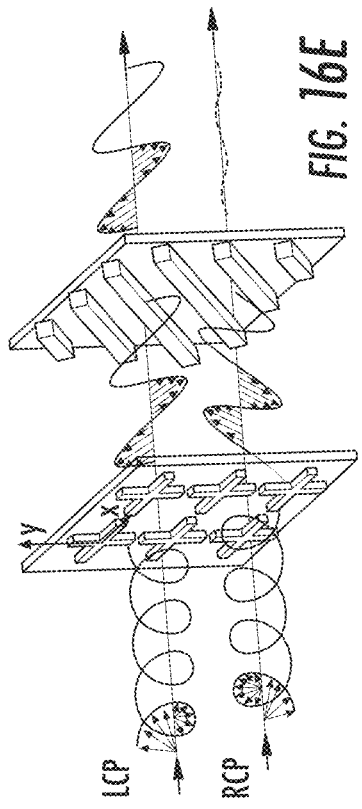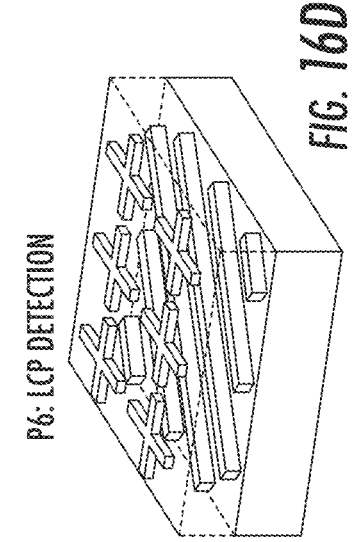
FIG. 16A
FIG. 16B
FIG. 16C
FIG. 16D
FIG. 16E

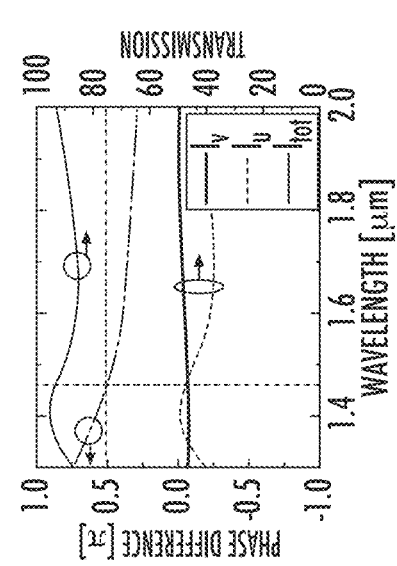
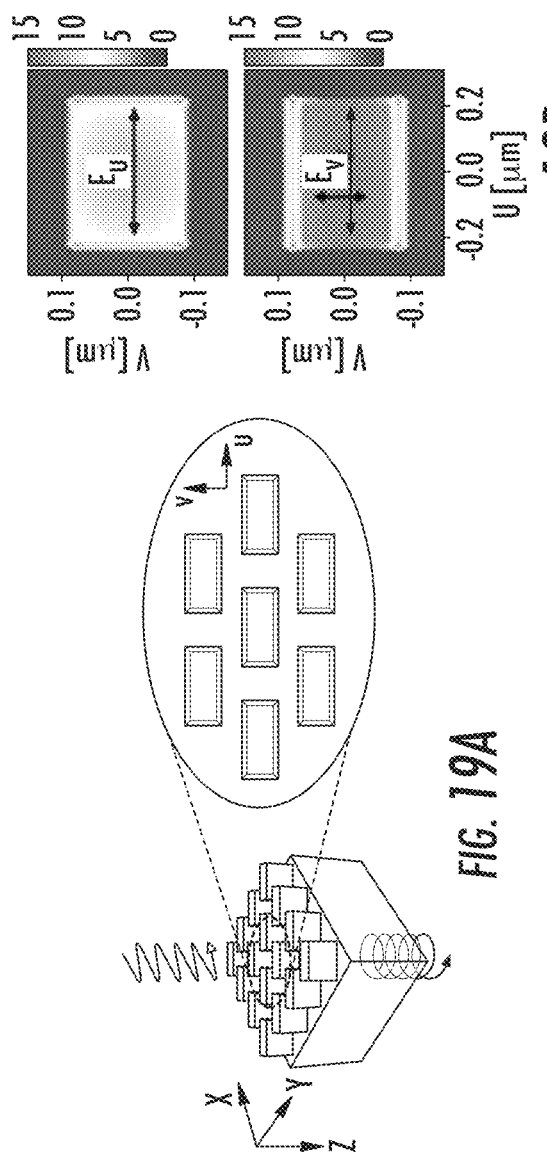
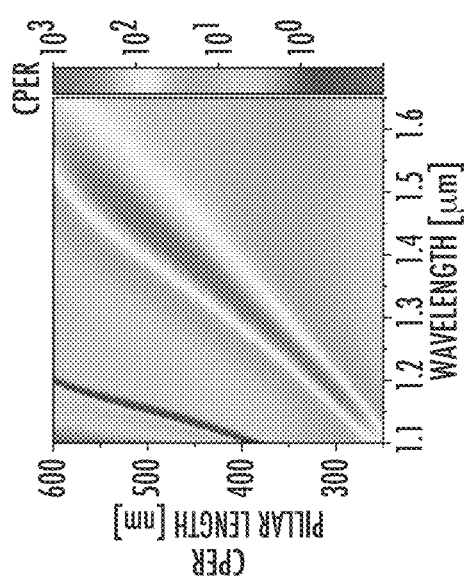
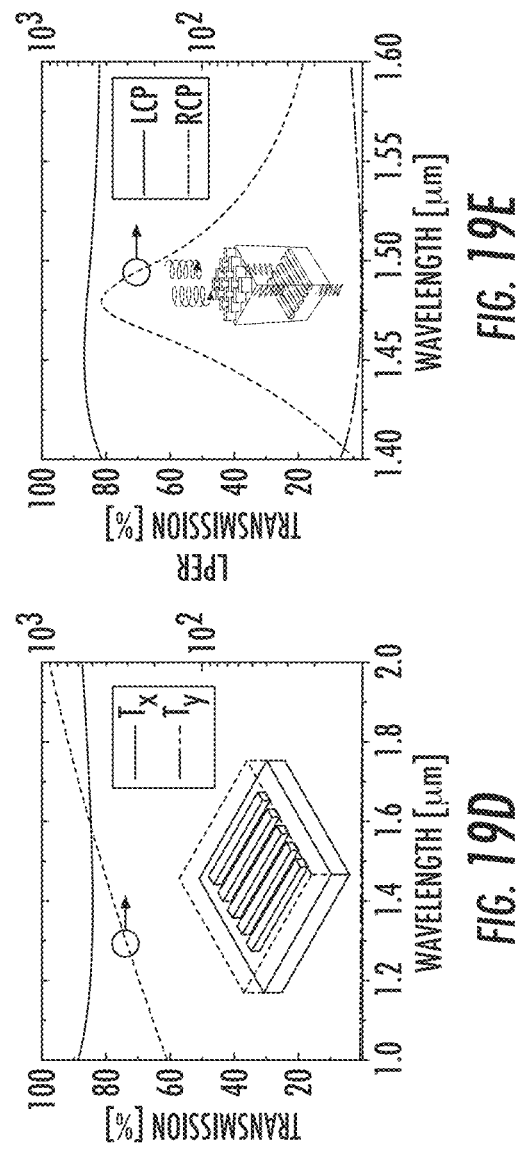
FIG. 19A
FIG. 19B
FIG. 19C
FIG. 19D
FIG. 19E
FIG. 19F

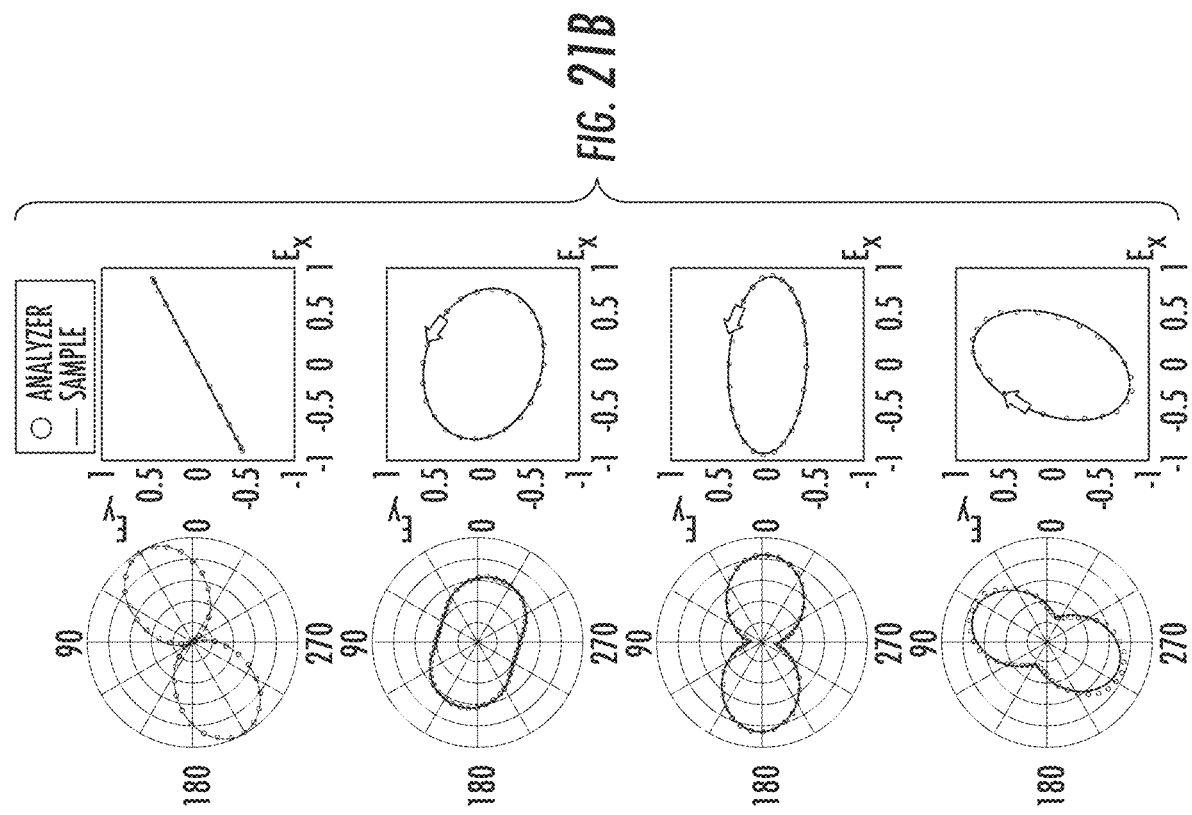
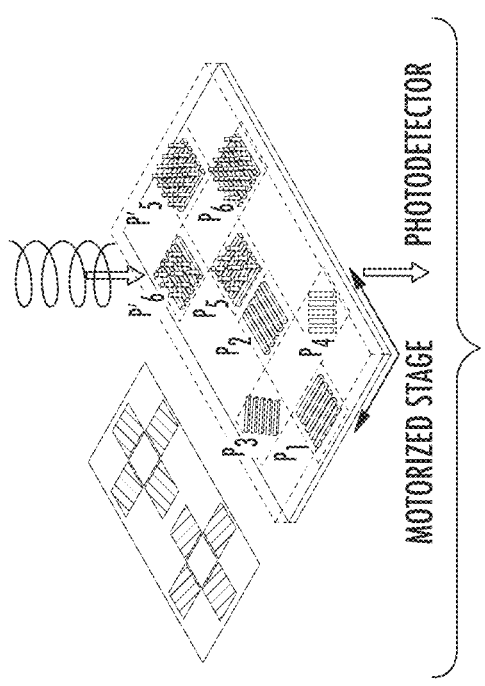
FIG. 21A
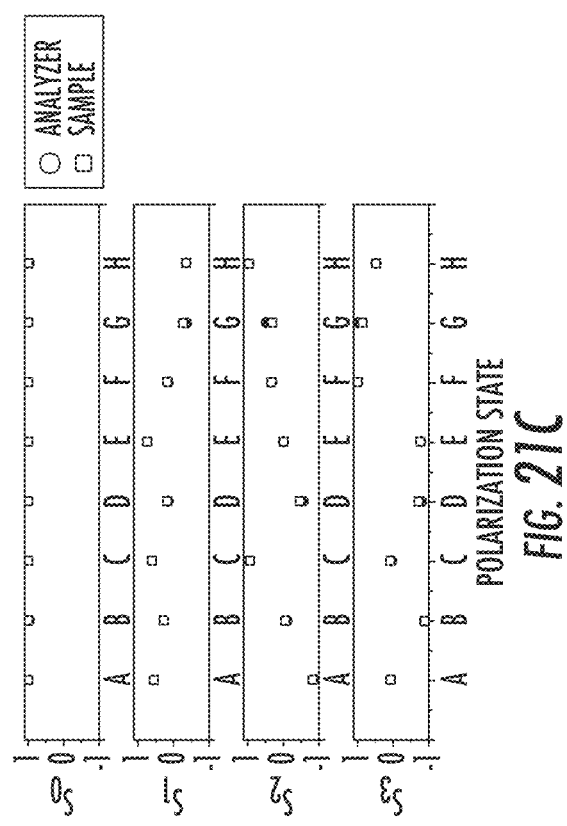
FIG. 21B
FIG. 21C

ON-CHIP POLARIZATION DETECTION AND POLARIMETRIC IMAGING

CROSS-REFERENCE TO RELATED APPLICATIONS

This application is a continuation of U.S. patent application Ser. No. 16/956,988, filed on Jun. 22, 2020 and entitled "ON-CHIP POLARIZATION DETECTION AND POLARIMETRIC IMAGING." The Ser. No. 16/956,988 application is a national stage conversion under 35 U.S.C. § 371 of PCT Application No. PCT/US2018/067109 entitled "ON-CHIP POLARIZATION DETECTION AND POLARIMETRIC IMAGING" filed Dec. 21, 2018, which claims priority to U.S. Provisional Application 62/609,877, filed on Dec. 22, 2017, the entire disclosures of which are hereby incorporated by reference in their entireties.

BACKGROUND

The polarization state of a light wave is defined by the oscillation behavior of its associated electric field vector. Light waves may be linearly polarized, indicating a constant orientation of the electric field vector, circularly or elliptically polarized, indicating a rotating (in either a left-hand or right-hand direction relative to the propagation vector) e-field vector with varying amplitude as it rotates, or randomly polarized. A complete mathematical description of the polarization state of a light wave is provided by the Stokes Parameters, $S_0$, $S_1$, $S_2$, $S_3$, defined below:

$$S_0 = I$$
$$S_1 = Ip\cos 2\psi * \cos 2\chi$$
$$S_2 = Ip\sin 2\psi * \cos 2\chi$$
$$S_3 = Ip\sin 2\chi$$

where, I is intensity, p is a degree of polarization between zero and one, and $\psi$ and $\chi$ represent the rotation angle and ellipticity angle of a polarization ellipse.

The ability to quickly and easily characterize the polarization state of an optical signal would be useful in many applications, ranging from biometrics to optical communications. For example, circularly polarized light ("CPL") is utilized in various electronic and photonic devices for applications such as optical communication of spin information, quantum-based optical computing and information processing. Polarization modulation, i.e., polarization based optical signaling, has become an attractive method for communicating optical data, demonstrating 3 dB better sensitivity than conventional communication approaches, better signal integrity in free space, and potentially a higher capacity/bandwidth. Imaging tissue under light of various polarizations, circular dichroism (CD) spectroscopy and other biomedical applications also rely on polarized light, specifically CPL. Specifically, many biomedical applications rely on the fact that chiral molecules and materials can cause significantly different optical response to CPL, and thus the different molecular interactions with left handed circularly polarized ("LCP") and right-handed polarized ("RCP") light can be used to identify and study the molecules and nanostructures. For these applications, it would be beneficial to both generate light of a known and predetermined polarization state and characterize the polarization state of received light with a high accuracy and sensitivity. This is particularly true for CPL.

However, because conventional devices used for light detection (e.g. semiconductor photodetectors) intrinsically lack of structural chirality, it is conventionally difficult to analyze the polarization state of light such as CPL using one single material or device. Rather, multiple bulky optical elements such as polarizers, waveplates and mechanically rotating parts are conventionally used to convert light from linearly polarized light (LPL) to CPL and vice versa. This poses serious challenges to miniaturization and device integration, and usually further limits the optical performance (introducing loss and constraining bandwidth) of the resulting instrument. Recently, organic chiral dyes have been used as a filter to generate CPL, and a chiral organic semiconductor transistor has been demonstrated for direct detection of CPL using the intrinsic chiral response of helicene. However, organic materials are much less stable in ambient conditions (temperature, humidity, oxygen, light, etc.) compared to inorganic materials, and they considerably constrain the process integration with other materials for more complex functionalities. Furthermore, the organic materials also have a limited electronic response time and small operational wavelength range.

More recently, CPL detection has been implemented by inorganic chiral metamaterials with hot-electron injection mechanism, showing somewhat better promise for on-chip detection. However, such chiral structures have limited extinction ratio in both absorption and electrical current signals of LCP and RCP (<3.5), and the structural design is rather complicated for large-scale inexpensive fabrication in order to be implemented in practical applications. Additionally, the hot-electron generation process is usually associated with noise that can degrade the signal-to-noise ratio.

In summary, conventional polarized light detection techniques still require slow and bulky analyzing tools, typically benchtop-sized devices, which operate on the scale of milliseconds. A small-scale, on-chip integrated polarization characterization instrument with response times on the order of nanoseconds or even shorter would be desirable.

SUMMARY OF THE INVENTION

The subject matter disclosed herein improves upon the aforementioned disadvantageous conventional approaches to polarization characterization by providing ultrathin, on-chip integrated polarization sensing elements, which extract the polarization state of light at each pixel of an image sensor using a simple algorithm within picosecond timescale.

In one aspect, the present disclosure describes a polarization sensing element. The polarization sensing element comprises a metamaterial layer acting as a polarization discriminator in proximity to a photodetector pixel. As used herein, a metamaterial layer refers to an artificially engineered material incorporating nanostructure (i.e., subwavelength) patterning of a dielectric or metallic material to realize certain unique properties by design. In one aspect, the metamaterial includes a metasurface layer itself which acts as a quarter-wave plate and which serves to convert incident LCP or RCP light to linearly polarized light. As used herein, a metasurface layer refers to a subwavelength-thick nanostructured film which is engineered to interact with light in a designed manner. The metastructure also includes a linear polarizer, which analyzes the light produced by the metasurface quarter-wave plate. In certain aspects, the quarter wave plate layer is realized by an all dielectric or all semiconductor metasurface, or a by a cross-shaped antenna or aperture and the linear polarizer is realized by a linear metallic grating. Metasurfaces according to these aspects select for LCP or RCP light by alignment of the fast axis of the quarter-wave plate structure with the orientation of the linear polarizing grid. Both of these components of the metamaterial, in certain embodiments, are fabricated on dielectric or semiconductor chip substrates according to conventional photolithography nanofabrication processes.

In another aspect, compound sensors capable of direct measurement of the Stokes parameters of an incident optical signal is provided. The compound sensors include subpixels that directly measure circular and linear polarization components of an incoming signal. These subpixel sensors include metamaterials including circular polarizers working in conjunction with linear polarizing filters (i.e., analyzers), working themselves in conjunction with a photodetector element that receives light from the linear polarizers. Other subpixels include only linear polarizers and photodetector pixels. These subpixels (i.e., circular polarization detectors and linear polarization detectors) are grouped into superpixels that can directly measure the polarization components of incoming optical signals, and output data from which the Stokes parameters can be directly calculated. In one aspect, these super pixels include two circular polarization sensors, one for LCP and the other for RCP, each sensor designed according to the arrangement set for above, and each in proximity to a photodetector pixel. These compound sensors also include two linear polarization sensors comprising linear nano-grids in proximity to a photodetector pixel. The linear polarization sensors are arranged to detect linear polarized light at mutually orthogonal orientations.

In another aspect, the polarization sensing superpixels include one circular polarization sensor, and three linear polarization sensors having polarization axes oriented at 45, −45 and 90 degrees relative to one another. In another aspect, the polarization sensing super pixels have two CPL sensors and four LP sensors. In certain optional embodiments, the polarization sensing subpixels are interleaved with polarization insensitive photodetector elements, realizing a polarization camera. As above, compound sensors according to this aspect of the invention are optionally fabricated as systems-on-chip according to conventional nano-fabrication processes.

Aspects of the invention have certain advantages over conventional devices and methods for polarization detection. First, the metasurface (i.e., the quarter-wave plate element) and the nanogratings are functionally decoupled, hence allowing the designers to flexibly choose different materials and structures.

Second, polarization sensors according to aspects of the invention do not require complicated 3D fabrication or stacking of many layers (usually >4 for optimal chiral performance) for complex helical 3D structures. Rather, nanostructures according to aspects of the invention require only simple geometries, and thus are well suited for large-scale inexpensive fabrication.

Third, the overlay of the two layers of nanostructures (retarder element and grating element) is insensitive to translational and rotational errors. On one hand, the use of 1D gratings makes the metamaterials completely immune from any translational errors and removes the stringent alignment requirement that seriously challenges the conventional stacked metamaterial designs. On the other hand, small rotation angle θ errors between the metasurface (i.e., the retarder's fast axis) and to transmission axis of the nanogratings will only approximately affect the electric field along the X- and Y-direction by a small factor cos θ, which is less than 0.5% when θ<5°, which is a comfortable tolerance that can be met in fabrication.

Fourth, in certain embodiments, the metasurface is made of dielectric or semiconducting materials to reduce optical loss. The use of dielectric or semiconductor metasurface reduces optical loss and solves the inherent problems associated with metallic materials in UV and high-energy visible range due to their plasmon frequency. Therefore, materials used to fabricate structures according to aspects of the invention are readily compatible with semiconductor manufacturing and suitable for large-scale metamaterial production.

Fifth, unlike resonant metallic metasurfaces that are strongly wavelength dependent, dielectric metasurface designs effectively have a strong and wavelength-insensitive birefringence for phase control. Therefore, embodiments of the invention including dielectric-plasmonic hybrid designs can have a broadband operation with only a subwavelength thickness.

Sixth, embodiments of the invention use different retarder materials to achieve polarization detection in different wavelength ranges. Si and GaN based metamaterials function in infrared and visible ranges, and even shorter wavelength ranges (e.g. UV) are achievable by selecting the proper materials and design parameters. For example, AlN is usable for metamaterials optimized for UV. High index materials such as Germanium, Magnesium Fluoride, Zinc Selenide and Sapphire are usable according to inventive embodiments to realize retarder metasurfaces while managing the overall physical thickness of the structure.

Among general advantages of embodiments disclosed herein are compatibility with existing silicon-based devices and semiconductor fabrication techniques (including CMOS processes), scalability to ultra-compact footprints, and functionality across wide ranges in wavelength, including mid-infrared, where alternative approaches may perform poorly due to strong material absorption or weak birefringence.

Some embodiments are capable of circular polarization filtering with extinction ratios of greater than 100 in simulations and have realized circular polarization filtering with extinction ratios higher than 30, transmission efficiencies near 80% for near-infrared wavelengths of 1.3 μm to 1.6 μm with low loss (<0.45 dB) in experimentally fabricated structures.

Furthermore, some embodiments have been demonstrated experimentally to measure linear polarization with an accuracy of at least 3.5% and circular polarization with an accuracy of at least 10%.

The foregoing and other advantages of the disclosure will appear from the following description. In the description, reference is made to the accompanying drawings which form a part hereof, and in which there is shown by way of illustration certain aspects of the disclosure. These aspects do not necessarily represent the full scope of the disclosure, however, and reference is made therefore to the claims and herein for interpreting the scope of the disclosure.

BRIEF DESCRIPTION OF THE DRAWINGS

FIGS. 4(a)-(d) show circular polarization filters incorporating a metasurface and certain performance parameters thereof according to an inventive embodiment.

FIGS. 6(a)-(c) show an alternative embodiment for a polarization filter realized as a cross bar antenna and certain performance characteristics thereof.

FIGS. 7(a)-(e) show an alternative embodiment for a polarization filter realized as a cross aperture and certain performance characteristics thereof.

FIG. 16 schematically illustrates operation of an integrated polarization sensor according to an inventive embodiment.

FIG. 19 illustrates additional performance characteristics of the alternative polarization filtering elements of FIG. 18

FIG. 21 schematically illustrates additional experimental measurements performed on polarization filtering elements of an integrated polarization sensor according to an inventive embodiment and includes further measurement results.

DETAILED DESCRIPTION OF THE INVENTION

Figure 1A:
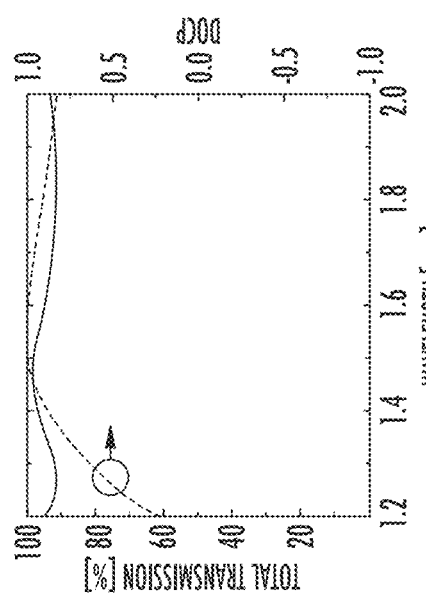
FIGS. 1(a)-(c) show a schematic diagram of a silicon metasurface acting as a quarter wave plate and certain performance characteristics thereof.

Various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the singular forms "a", "an", and "the" include plural aspects unless the context clearly dictates otherwise.

This disclosure describes nanoscale optical structures, devices, and methods of making and using the same. It should be apparent to those skilled in the art that many additional modifications beside those already described are possible without departing from the inventive concepts. In interpreting this disclosure, all terms should be interpreted in the broadest possible manner consistent with the context. Variations of the term "comprising" and "including" should be interpreted as referring to elements, components, or steps in a non-exclusive manner, so the referenced elements, components, or steps can be combined with other elements, components, or steps that are not expressly referenced. Embodiments referenced as "comprising" certain elements are also, alternatively contemplated as "consisting essentially of" and "consisting of" those elements.

Embodiments of the invention rely on the anisotropic polarization response of metasurfaces, that is, surfaces defined by sub-wavelength scale structures, to alter and filter the polarization state of light passing through the metasurface. One way metasurfaces accomplish polarization effects is through metasurface geometrically induced birefringence. Certain inventive embodiments rely on arrays of nano-scale, anisotropic structures, which by their size and shape, exhibit geometrical birefringence. An example of such a metasurface is shown schematically in FIG. 1(a), which illustrates a unit-cell quarter wave plate (for possible integration into a larger polarization sensor), including a metasurface. In the example of FIG. 1(a), the metasurface includes an array of rectangular silicon pillars disposed on a dielectric substrate. The asymmetric cross-section of each unit cell allows a large contrast in field confinement as the wave propagates through the structure. In fact, as can be seen in FIG. 1(a), the projected near-field along the long dimension of the pillars is almost completely localized within the silicon medium, forming the extraordinary axis. The near-field projection, along the width of pillars, is mainly located in air gaps between adjacent pillars, identifying the ordinary axis. This asymmetry in design results in different phase accumulation for the traveling wave in vertical directions, and hence, allows for the design of a quarter wave plate by varying the height of the pillars.

Figure 1B:
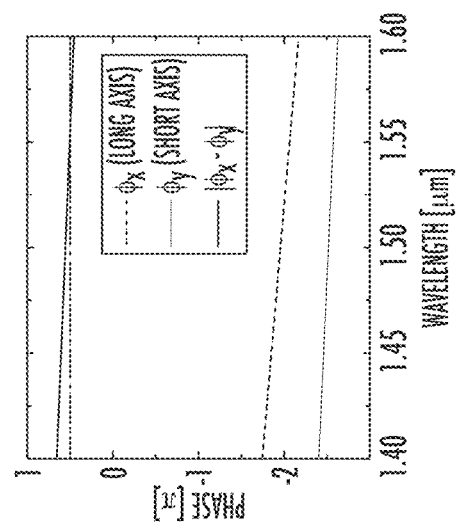

The quarter wave plate pictured schematically in FIG. 1(a) converts LP to CP by creating two orthogonal field components with identical amplitudes and $\pi/2$ phase difference. The relative phase advancement of the two field components or "retardation" corresponds to different handedness of light, i.e. LCP or RCP. As can be seen in FIG. 1(b) the thickness (i.e., height in z) of the silicon pillars, as well as their aspect ratio and the fraction of their cross-section over unit cell area (filling or occupation factor) is chosen to achieve a $\pi/2$ phase difference for a broad spectral range (>300 nm), corresponding to >98% DOCP (FIG. 1(c). Moreover, owing to low absorption in silicon above bandgap energy (~1.1 eV), transmission through the quarter waveplate is very high-above 90% for this spectral window.

Figure 1C:
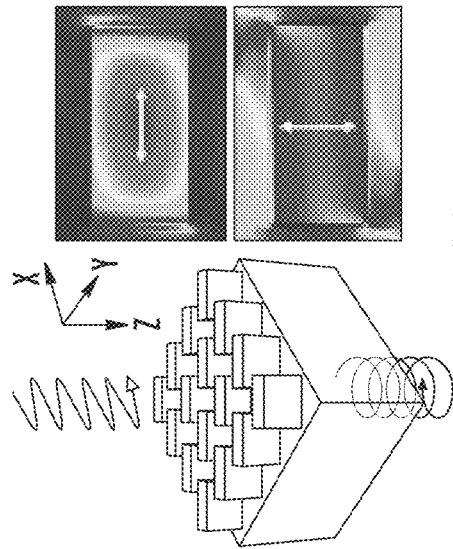

Referring still to FIGS. 1(a)-(c), the quarter wave plate of FIG. 1(a) converts linear to circular polarized light due to the birefringence effect of the silicon pillar metasurface. The plot of FIG. 1(a) depicts the near-field electromagnetic energy confinement along the long and short axes of QWP illuminated by LPL in x- and y-directions. The fact that the different e-e-fields are experiencing different refractive indices is shown. In the embodiment of FIG. 1, the length and width of cross sections of each of silicon pillars are 460 nm and 160 nm, respectively, while the periodic length (i.e., center to center spacing of the pillars) in both x and y directions is 460 nm. The Si thickness (z axis height of the pillars) is 700 nm. The silicon pillars are disposed on a dielectric spacer layer (e.g., $SiO_2$) that is 300 nm thick. FIG. 1(b) shows the phase accumulation dispersion along x and y directions as a function of wavelength. The dashed line indicates when their relative difference is $\pi/2$, which is the condition for LP to CP conversion or vice versa. FIG. 1(c) shows total transmission and the corresponding degree of circular polarization induced by the structure of FIG. 1(a) as a function of wavelength.

Figure 2A:
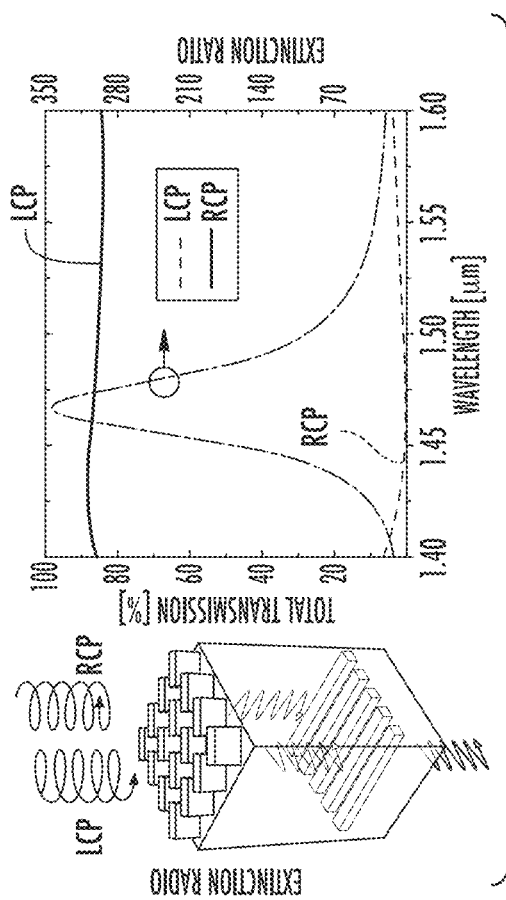
FIGS. 2(a)-(b) show schematic diagrams of circular polarization filters according to an inventive embodiment, and certain performance characteristics thereof.

FIGS. 2(a) and (b) schematically illustrate RCP and LCP polarization sensors constructed according to an inventive embodiment using the silicon metasurface quarter wave plate discussed above in reference to FIGS. 1(a)-(c). As in FIG. 1(a), the quarter wave plate metasurfaces of FIGS. 2(a) and (b) include an array of rectangular cross-section silicon pillars disposed on a dielectric substrate, which serve to create a $\pi/2$ phase lag between e-field components of an optical signal as it propagates through the surface, with the ultimate effect being the generation of linearly polarized light from circularly polarized light. As can be seen, the orientation of the emergent LPL depends on the handedness of the input CPL. As in FIG. 1(a), the quarter wave plate portions of the metamaterial illustrate in FIG. 2 include silicon pillars that measure 460 nm×160 nm, on a 460 nm grid, with a height of 700 nm. Again, as with the embodiment of FIG. 1, these parameters are exemplary, providing one suitable design for the near-infrared using a silicon metasurface structure. The exact design will vary according to the wavelength at which the device is to be used, the materials chosen, the required degree of polarization, insertion loss, optimal physical thickness, etc.

Figure 2B:
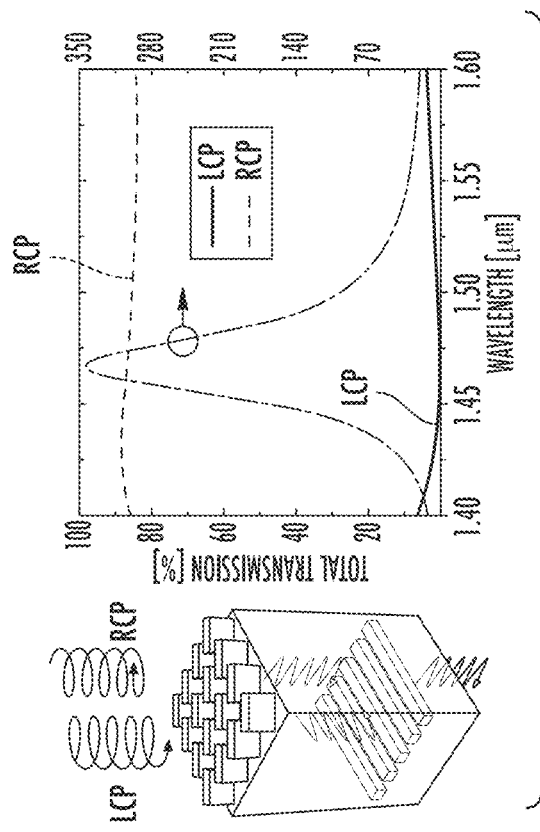

The devices pictures in FIGS. 2(a) and (b) also include linear polarizers disposed below the quarter wave plate metasurfaces, acting as analyzers. In one exemplary embodiment, the linear polarizers are formed from aluminum nanogratings, which work in conjunction with the silicon metasurface structures for LP and CPL detection for the whole visible wavelength range. In the embodiment of FIG. 2, aluminum is used as the material for nanogratings due to its high plasmonic frequency and compatibility with CMOS fabrication process. The gratings are disposed on a back side of a dielectric spacer, which in one embodiment, is 300 nm thick. The transmission axis of the gratings shown in FIGS. 2(a)-(b) is oriented depending on whether the polarization sensors are intended to detect RCP or LCP that is incident on the quarter wave plate metasurface. As can be seen in FIG. 2(a), the linear polarizer is aligned to result in a RCP filter, i.e., to pass linearly polarized light oriented along the x axis that has been converted from RCP incident on the quarter wave plate, and to block orthogonally polarized light. In the device of FIG. 2(b) the linear polarizer is aligned to transmit y oriented LPL, converted from LCP incident on the quarter wave plate, and to block orthogonally polarized light. Thus the device of FIG. 2(b) functions as an LCP filter. These filters can be integrated into CPL detectors by providing a photocell to receive the light passed by the linear polarizers. Such devices are described more fully below in reference to FIGS. 9-11.

Figure 3A:
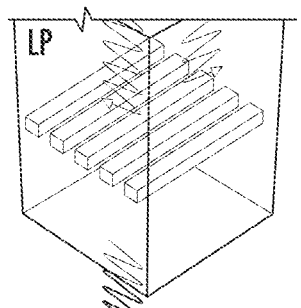
FIGS. 3(a)-(d) show schematic diagrams of polarization filters according to certain inventive embodiments and transmission curve associated therewith.
Figure 3B:
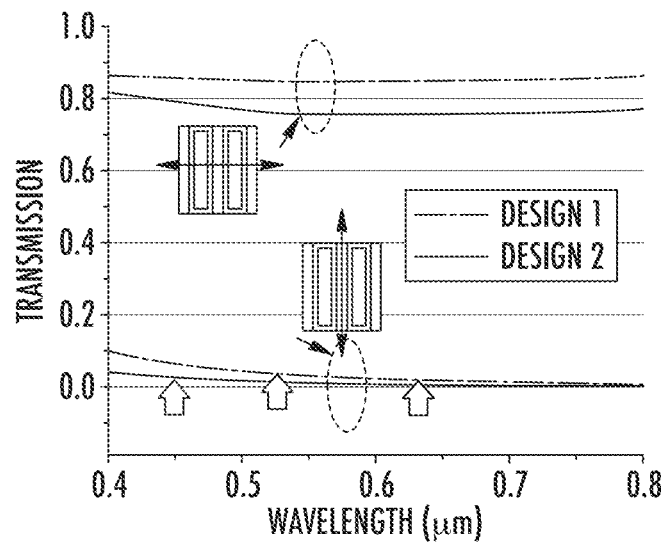

Like the design of the quarter wave plate, the specific grating design will vary depending on various design parameters, such as desired transmission/insertion loss, extinction ratio and wavelength. FIG. 3 illustrates the performance of two designs for a linear polarizing grating (FIG. 3(a)) used in conjunction with a CPL filter (FIG. 3(c)) according to an inventive embodiment. The grating designs of FIG. 3 have been optimized for different colors to realize both high extinction ratio and low insertion loss. FIG. 3(b) shows the transmission of both designs for light polarized along and vertical to the grating orientation. Design 1 is optimized for green and red light with high extinction ratio (>50) and transmission (>85%), while design 2 is optimized for blue light with high extinction ratio (>50) and transmission (>75%). The period and duty cycle of the grating designs are 120 nm and 40%/50%, respectively.

Figure 3C:
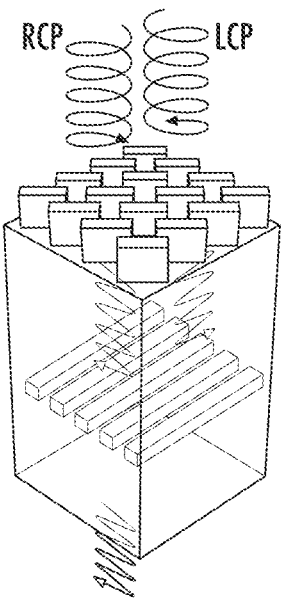
Figure 3D:
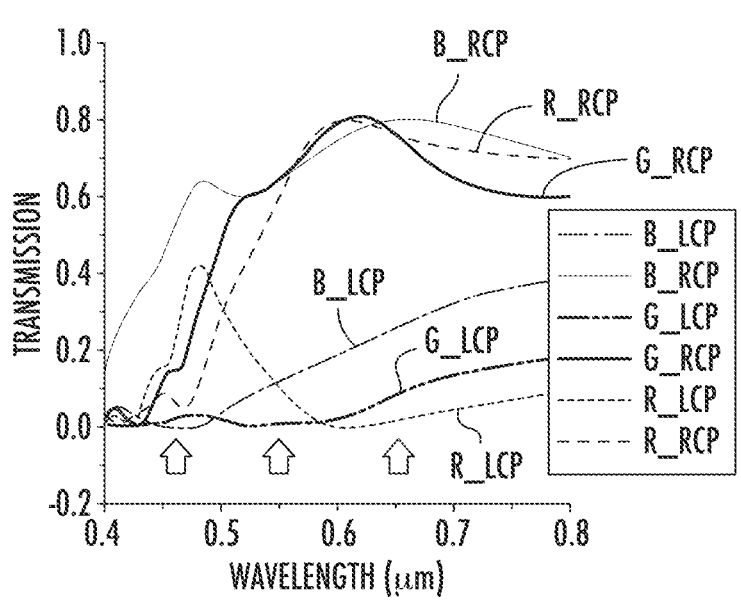

FIG. 3(c) shows a device for CP light detection, were the design of the silicon metasurface structures, integrated with aluminum nanogratings, has been optimized for performance in the visible spectrum. In the design of FIG. 3(c), individual Silicon nanopillars are 100-140 nm long, 50-80 nm wide and 100-200 nm thick. Specifically, the red optimized design used 140×80 nm pillars with a height of 200 nm; the green optimized design used 140×80 nm pillars with a height of 160 nm and the blue optimized design 100×50 nm pillars with a height of 100 nm. All these designs exhibit high extinction ratios (>30) for the optimized wavelength range and operate over a broad wavelength range centered around the optimal wavelength, as shown in FIG. 4(d). The total unit cell area in the simulation giving rise to the data of FIG. 4(d) is ~1 $\mu m^2$. The transmission efficiencies for green and red light are ~60% and ~70%, respectively. For blue light, the efficiency is lower, ~40%. The loss introduced in transmission is attributed to both silicon metasurfaces and the aluminum nanogratings underneath. The stronger absorption in silicon at shorter wavelength will lead to additional absorption, which, however, is only a small portion (~10% for the blue color) thanks to the small thickness of silicon metasurface (120 nm for the design optimized for blue color).

Referring now to FIGS. 4(a)-(d), there is shown a polarization sensor and certain performance parameters thereof according to an inventive embodiment. FIG. 4(a) provides a top view of two unit cells of the designed structures, which selectively transmit only RCP (left panel) or LCP (right panel) light. As can be seen in FIGS. 4(a) and 4(c), the sensor of FIG. 4 includes two basic layers, which are realized as nanostructures. A first layer is a nanostructured metasurface including bars of higher index material, which introduces a $\pi/2$ phase shift and functions as a quarter wave plate for incoming light a within a designed for wavelength rage. The material and/or structure of layer is anisotropic resulting in a different optical response to the light polarizations along the X- and Y-axis. A variety of structures for layer are acceptable including, for example, nanorods or crosses. As a result of the retardation introduced by surface, that surface effectively converts light from CPL to LPL and vice versa. The axis of orientation of the LPL depends on the handedness of the incoming CPL, as shown in FIG. 4(c).

The sensor of FIGS. 4(a)-(d) includes a second layer, which is a linear polarizer. The linear polarizer is separated from quarter wave plate layer by a thin dielectric layer, which may be part of the substrate on which the active optical layers are fabricated or otherwise disposed. The orientation (i.e. transmission axis) of linear polarizer is selected to pass incident light having a predetermined polarization axis. Thus, together, the quarter wave plate layer and the linear polarizer layer are designed and oriented relative to each other to pass light incident on the entire structure having a predetermined, selected circular polarization state, and to block light incident on the structure having the opposite circular polarization state.

Referring to the hybrid chiral metamaterial design of FIG. 4 in more detail, the retarder layer, in one embodiment, is a dielectric or semiconductor metasurface, of sub-wavelength thickness, in this case about one quarter the free space wavelength of the designed-for wavelength of 1.45 µm. In one embodiment, it is fabricated of silicon bars, but this is not a requirement. Metasurfaces according to certain embodiments rely on having an anisotropic variation of index of refraction (i.e., birefringence), that is provided by an optical medium having a sub-wavelength anisotropic structure. This can be provided geometrically, e.g., by the array of rectangular bars or rectangular cross-sectional pillars of high index material (in one example, Si) described above, in a lower index matrix (like free space), but the exact material and geometry chosen are design parameters can vary within the scope of the invention depending on the designed for wavelength and other considerations. Dielectrics and other semiconductors can be used, as can other structural geometries. Indeed, other ways of inducing anisotropic, sub-wavelength index variations are also within the scope of the invention, such as inducing gradient index variations in a monolithic material, rather than fabricating discrete structures such as pillars or bars.

Referring still to the design of FIGS. 4(a)-(d), when circularly polarized light (CPL) is incident on the top dielectric metasurface layer, it introduces a 90 degree phase shift to the two linear components, $E_x$ and $E_y$, of the CPL. Depending on the handedness of the incident CPL, the final phase difference between $E_x$ and $E_y$ after dielectric metasurface will be 0 or 180 degree, and thus the transmitted light becomes LPL oriented along u or v direction (illustrated in FIG. 4(c)). Taking, for example, the unit cells "R" and "L" of FIGS. 4(a) and 4(c), the RCP and LCP are converted to LPL with the electrical field components along u and v directions, respectively. The metallic nanogratings of the linear polarizing layer then function to selectively transmit the LPL oriented vertically to the nanowires. As a result, unit cell "R" (FIG. 4(a)) will exhibit high transmission for RCP, but close to zero transmission for LCP. Similarly, unit cell "L" (FIG. 4(a)) LCP will selectively transmit LCP.

Compared to natural birefringent materials, such as liquid crystals, the dielectric metasurface provides much stronger birefringence and therefore can be made very thin to achieve desired phase different between two polarization. FIG. 4(d) shows the calculated effective mode indices $n_x$ and $n_y$ for a silicon metasurface design. At the optimal wavelength (1.45 µm for this design), the difference mode indices can be close to 1. Therefore the required thickness to achieve 90 degree phase shift is much less than the wavelength, about ¼ of the vacuum wavelength $\lambda_0$ (FIG. 4(d)). Importantly, such a metasurface design can be generalized to a variety of different materials and engineered to operate at different wavelength range. Considerations along these lines are discussed below with respect to FIGS. 5(a)-(d).

Light transmitted by the linear polarizer layer may optionally be passed to and detected by a non-illustrated photosensitive element such as a photodiode, thermocouple/pyrometer, charge-couple device (CCD) pixel, or any other device that generates a detectable electrical signal in response to incident light ("photodetector").

In the embodiment of FIG. 4, although neither of the top metasurface and bottom grating layer is chiral, the combination of the two function as a metamaterial possessing no inversion center and no reflection symmetry. Hence, the entire, combined structure is chiral. The result is that if the simplest bar shape is chosen for the metasurface (retarder surface), and rotation is introduced between the two layers, the mirror symmetry will be broken as long as the rotation angle is not 90 or 180 degree. In other words, even though mirror symmetry applies to each individual layer, such symmetry is essentially broken for the double-layer structure as a metamaterial.

The sensors of FIG. 4 have excellent performance characteristics, as can be seen from FIGS. 4(b) and (d). FIG. 4(d) shows the simulated near field distribution of the two modes in the silicon metasurface excited by Ex and Ey polarized light and FIG. 4(d) shows the optical birefringence effect of the dielectric metasurface. The plot of FIG. 4(d) shows the difference between the effective mode indices $n_x$ and $n_y$ of the two modes excited by $E_x$ and $E_y$ as well as the required thickness of silicon metasurface to achieve 90 degree phase shift between the two modes.

In the sensor of FIG. 4, the optical elements are composed of two ultra-thin functional layers, i.e. dielectric (or semiconductor) metasurfaces (top-retarder) and metallic nanogratings (bottom-polarizer). This achieves a low-loss dielectric-plasmonic hybrid chiral metamaterial design with maximum circular dichroism ("CD") close to 100%. The top metasurface is designed with a high birefringence due to the fact that different modes are excited by incident electric field along x and y directions. FIG. 4(b) shows the field distribution of the two modes '$E_x$' and '$E_y$'. Since the field distribution of 'Ex' mode is mainly in the dielectric while '$E_y$' mode is a highly confined gap mode, it is possible to achieve very large difference between their effective mode indices, in another words, strong birefringence, by carefully engineering the structure and choosing the proper material. Such a strong birefringence can be used to introduce a large phase shift between $E_x$ and $E_y$ components and thus realize an effective waveplates with minimal physical thickness. In addition, because the metasurface layer and the nanogratings are functionally decoupled, the two layers can be separated by a thin dielectric layer, making the whole metamaterial design ultrathin (subwavelength) and very compact.

Figure 5A:
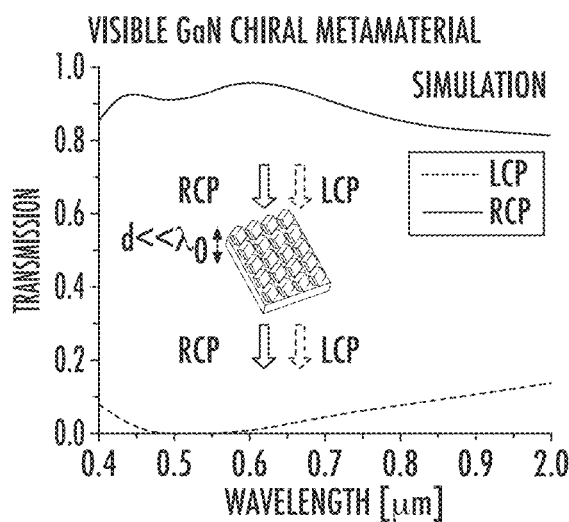
FIGS. 5(a)-(d) show certain design parameters relevant for optimizing the polarization filters of FIGS. 4(a)-(d) for different wavelengths.
Figure 5B:
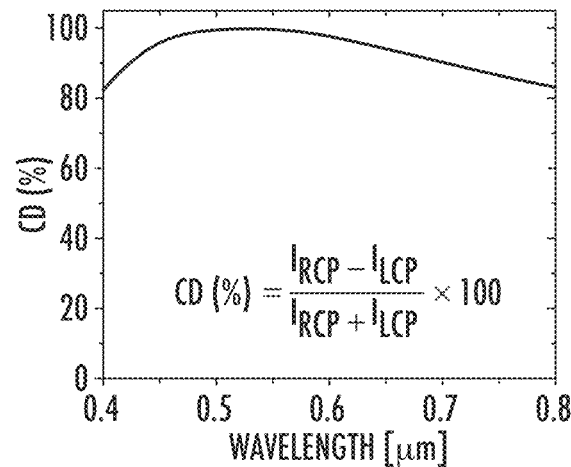
Figure 5C:
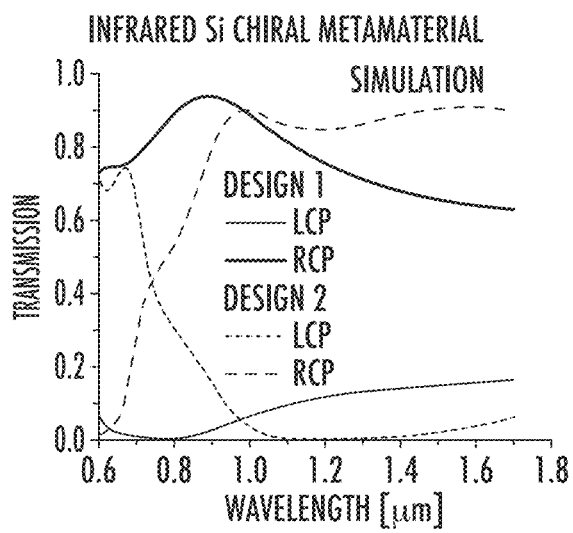
Figure 5D:
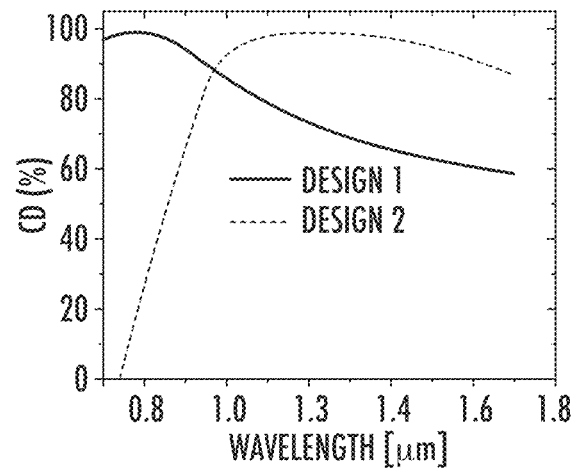

Some of the wavelength optimization possible under the design of FIGS. 4(a)-(d) is illustrated in connection with FIGS. 5(a)-(d). There is shown the performance of broadband low-loss dielectric-plasmonic hybrid chiral metamaterials with strong CD based on GaN (top) and Si (bottom) metasurfaces. For the GaN metasurface, an array of pillars measuring 200 nm in height, 300 nm in length, and 200 nm in width was used. For the Si metasurface, the pillar height was 300 nm, length 200 nm, and width 130 nm. Both designs were fabricated on a dielectric spacer ($SiO_2$) that was 300 nm thick. FIG. 5(a) shows the transmission of a GaN chiral metamaterial designed at visible wavelength to selectively transmit RCP over LCP, obtained by full wave simulation (FDTD). FIG. 5(b) shows the calculated CD of the GaN-hybrid chiral metamaterial based on the data shown in FIG. 5(a). FIG. 5(c) shows the transmission of two silicon chiral metamaterials designed at infrared wavelengths to selectively transmit RCP over LCP, obtained by full wave simulation (FDTD). FIG. 5(d) shows the calculated CD of the silicon-hybrid chiral metamaterial based on the data shown in FIG. 5(c).

The design discussed above in reference to FIGS. 4(a)-(d) can be extended to wavelengths outside the near infrared. FIGS. 5(a)-(b) illustrate performance characteristics for such designs. For the visible wavelength range, a visible chiral metamaterial design was chosen using GaN. This material was selected because of its large bandgap and low optical absorption at visible wavelengths. FIG. 5(a) shows the transmission coefficients of a structure optimized to transmit RCP over the whole visible wavelength range. The calculated CD (defined as (%)=$(I_{RCP}-I_{LCP})/(I_{RCP}+I_{LCP}) \times 100$) is shown in FIG. 5(b). Besides the broadband wavelength coverage, this design is also has a large CD factor (close to 100% over the wavelength range 500-550 nm) and a high transmission of selected CPL (e.g. RCP with more than 90% over the whole visible wavelength range).

For the infrared chiral metamaterial design, silicon was used because its high refractive index enables metasurface structures with large birefringence. In addition, silicon is a widely used semiconductor suitable for large-scale material production. FIG. 5(c) shows the transmission coefficient of two designs optimized for selective transmission of RCP light at 700-800 nm and 1.1-1.4 µm. Due to the strong birefringence of the silicon metasurface (FIG. 5d), the thicknesses of the silicon metasurfaces in these two designs are only 200 nm and 300 nm, respectively. Both designs have shown large CD factors (~100% at the optimized wavelength regions, as shown in FIG. 4d) and high transmission for selected CPL (close to 90% for RCP at the optimized wavelength regions) and broad operational bandwidths.

Because the basic design principles underlying the designs of FIGS. 4 and 5 work for a wide range of materials, the dielectric or semiconductor metasurface materials need not be single crystalline, which greatly alleviating film growth demand. It has been found that suitable dielectric and semiconductor films can be deposited by conventional plasma enhanced chemical vapor deposition ("PECVD"), evaporation, and reactive sputtering tools or grown using a commercial vendor, and the film quality can be suitably ensured by a variety of available characterization tools, such as scanning electron microscopy ("SEM"), atomic force microscopy ("AFM"), ellipsometry, x-ray diffraction, etc.

Thus far, dielectric and semiconductor metasurfaces realizing quarter wave plates have been discussed, but other structures are possible and within the scope of the invention. For example, plasmonic nanoantennas, which are made of noble metals (Au, Ag, Al, Cu, etc.) can produce a π phase shift as the wavelength scans across its resonance, and thus are usable as half wave retarders. The antenna resonance is roughly located at $\lambda_{res}=2n_{eff}L$, where L and $n_{eff}$ are the antenna length and the effective index of the surrounding medium (media), respectively. The cross-shape nanoantennas can create a π/2 phase difference to the X- and Y-components of the electric field at a wavelength between the two resonance wavelengths where the field intensity ratio equals to unity. This is illustrated in the schematic depiction of a cross bar antenna at FIGS. 6(b) and (c).

FIGS. 7(a)-(e) illustrate an alternative embodiment for a polarization sensor according to the invention, and certain performance parameters thereof. The design of FIGS. 7(a)-(e) uses an ultracompact plasmonic chiral metamaterial surface in the form of a cross bar aperture, enabling highly selective transmission of CPL. Referring now to FIG. 7(a), there is shown a schematic diagram of an array of pixel sized polarization sensing elements. The array includes a top plasmonic metasurface including multiple unit cell quarter wave plates in the shape of anisotropic cross apertures combined with a bottom layer of metal nanogratings. Here the metasurface layer consists of anisotropic cross-shaped aperture structures, but a cross bar structure (rather than an aperture) surrounded by a different optical medium is also possible. The metasurface layer has a very small subwavelength thickness (40 nm), a nanocross width of 100 nm, and cross lengths of $L_x$=1.2 µm, $L_y$=1.6 µm. Because of the anisotropic geometry of the nanocrosses, such plasmonic metasurface layer supports two orthogonal plasmonic Eigen modes (FIG. 7(b)), which are designed to have identical amplitude and a π/2 phase shift to convert LPL into CPL or vice versa. The material of the top layer defining the apertures is metallic, and in one embodiment, gold.

FIG. 7(b) is an FDTD simulation showing the filed distribution of two eigenmodes responding to X- and Y-axis polarization for the device of FIG. 7(a). FIG. 7(c) shows SEM images showing focus-ion-beam (FIB) cut nanoapertures in a fabricated prototype of the design. FIG. 7(d) shows measured transmission of CPL with different handedness, showing a very high extinction ratio of the polarizations. FIG. 7(e) shows CD (defined as $(I_{RCP}-I_{LCP})/(I_{RCP}+I_{LCP}) \times 10$) of the metamaterial as high as >95%. As with FIG. 5, the sensor array of FIG. 7 is optionally coupled to a photosensor to enable measurement of circular polarization at various locations across the array.

Figure 8:
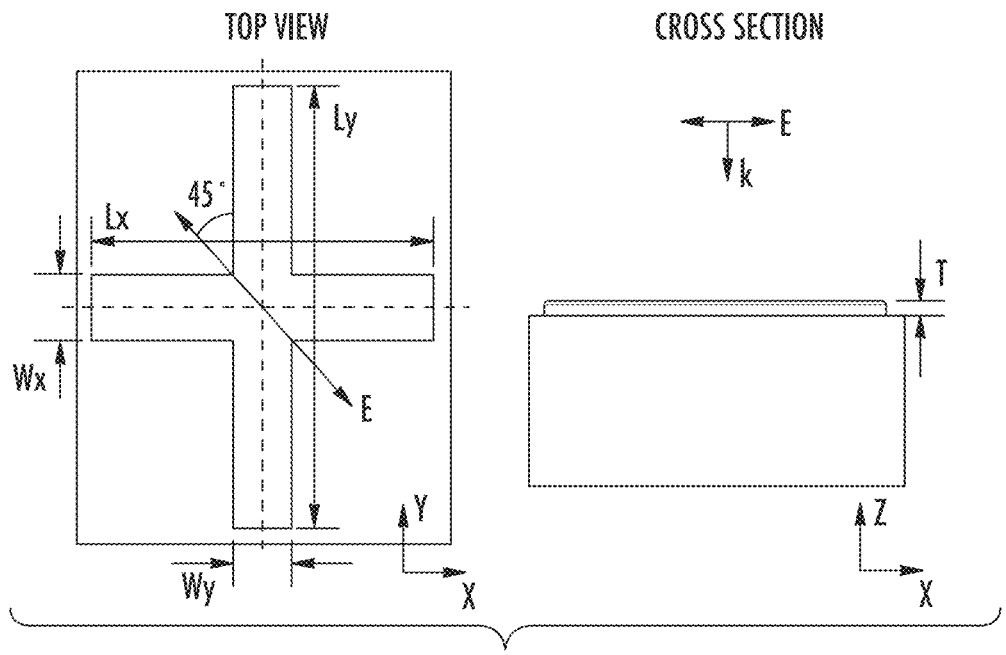
FIG. 8 is a top down and cross-sectional view of a quarter wave plate metasurface structure according to the embodiment of the invention.
Figure 9:
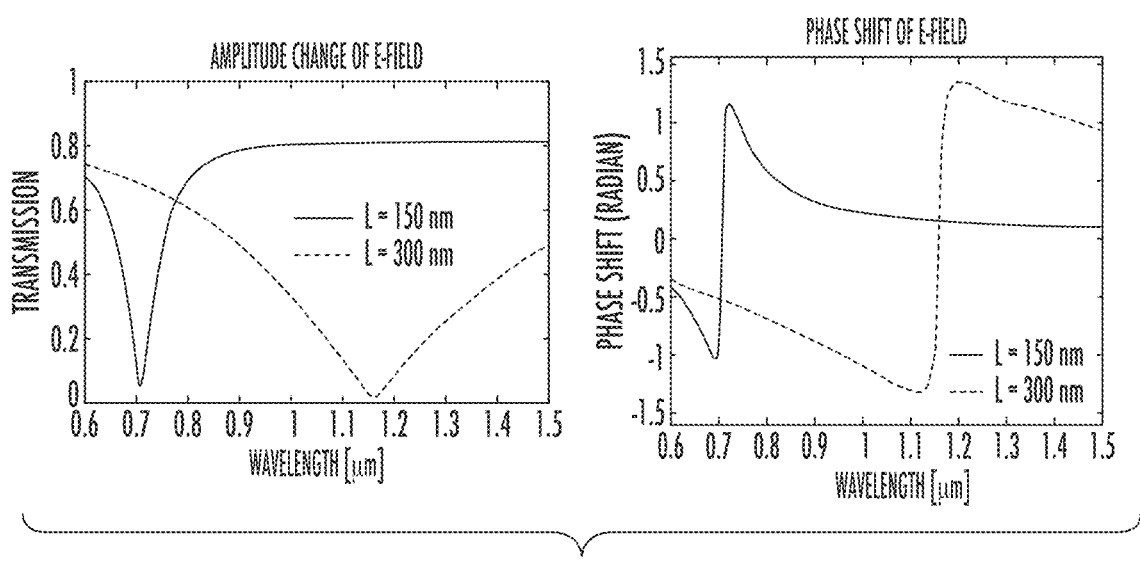
FIG. 9 shows performance characteristics of a quarter wave plate using the metasurface structure of FIG. 8.

FIG. 8 shows a top-down and cross sectional schematic representation of an alternative metallic retarder plasmonic metasurface designed as a cross bar antenna, such as the one pictured in FIG. 6(a). and FIG. 9 illustrates certain performance parameters associated with the design of FIG. 8 for near infrared wavelength. In the example of FIG. 9, the unit cell dimensions of each quarter wave plate are: 250 nm by 400. The aperture itself is defined by a silver layer deposited on $SiO_2$, having an index of 1.45 at the designed for good performance in the near infrared. The width and thickness of the aperture arms themselves is W=50 nm, T=40 nm, and the outside dimensions of the aperture are $L_x$=150 nm, $L_y$=300 nm. These physical parameters will change depending on the designed-for wavelength. For example, the chiral metamaterial of FIG. 7 was designed for optimal performance at a wavelength of 4 µm, where it demonstrated high CPL conversion efficiency and feasibility of on-chip integration (FIGS. 7(c)-(e)). The performance parameters shown in FIG. 6 reflect a design optimized for 6 µm. For this design the two arm lengths of the cross-shape bar nanoantenna are 1700 nm and 1400 nm, respectively. The antenna thickness is 40-50 nm. Here, as in the other examples, the anisotropic optical phase is introduced to light polarized along the short and long arms of the cross-shape aperture antenna, as illustrated in FIG. 7. The dielectric spacer layer between the antennas and the nanograting layer is chosen to be 300-500 nm, depending on the optimized condition for designed operational wavelength.

Figure 10:
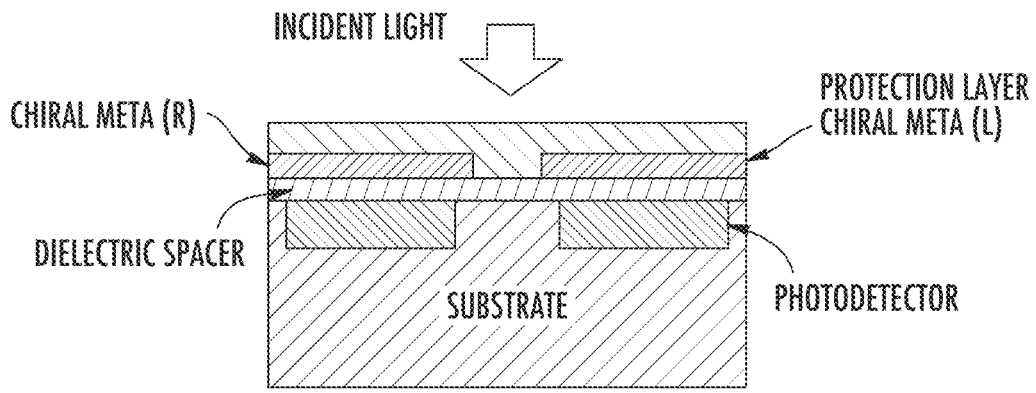
FIG. 10 is a schematic cross section of an integrated L/R circular polarization sensor according to an inventive embodiment.

The designs of FIGS. 6-9 have significant advantages: (1) they are highly selective to the designed handedness of CPL, with a high extinction ratio of ~27 at 4 µm (FIG. 7(d)) and a high CPL response (CD (%)>95% (FIG. 7(e)); (2) they have a small thickness, 40 nm in the case of the design of FIG. 7, which reduces material cost and extends the use to various substrates for flexible optoelectronics and smart skins; and (3) they are completely compatible with planar manufacturing technologies, which allows large-scale production. Moreover, the designs of FIG. 6-9 are feasible for high-efficiency CPL detection. Yet the incorporation of metallic metasurface introduces loss and limits the absolute transmission of selected CPL to ~22% (FIG. 7(d)), with operation in the mid-infrared range, and the detector being used still an isolated element, i.e., spaced off from the substrate layer on which the retarder plate and grating were fabricated. In alternative designs, dielectric and semiconductor based metasurface designs are exploited to achieve high-efficiency, low-loss, and on-chip integrated metamaterials for CPL detection at infrared and visible wavelength ranges. For example, FIG. 10 is a schematic cross section of an integrated polarization sensor fabricated on a chip, including a photodetector, according to an embodiment of the invention. For clarity, FIG. 10 is limited to a unit cell sensor for measuring L and R handed circular polarization. The design of FIG. 10 is fabricated on a doped, patterned substrate composed of a conventional semiconductor material (e.g. Si for visible detection or germanium for infrared detection), in which a photodetector is fabricated. A dielectric spacer is then disposed onto the substrate/detector. Then the metamaterials (e.g., the structures described above with respect to FIG. 1-3, 4 or 6-9), which are designed for LCP and RCP, respectively, are formed on the spacer, such that they are laterally aligned with two different photodetectors. The incident CPL is converted by the metamaterial to LPL, and collected directly by the photodetectors to identify the polarization of the incoming light.

Figure 11:
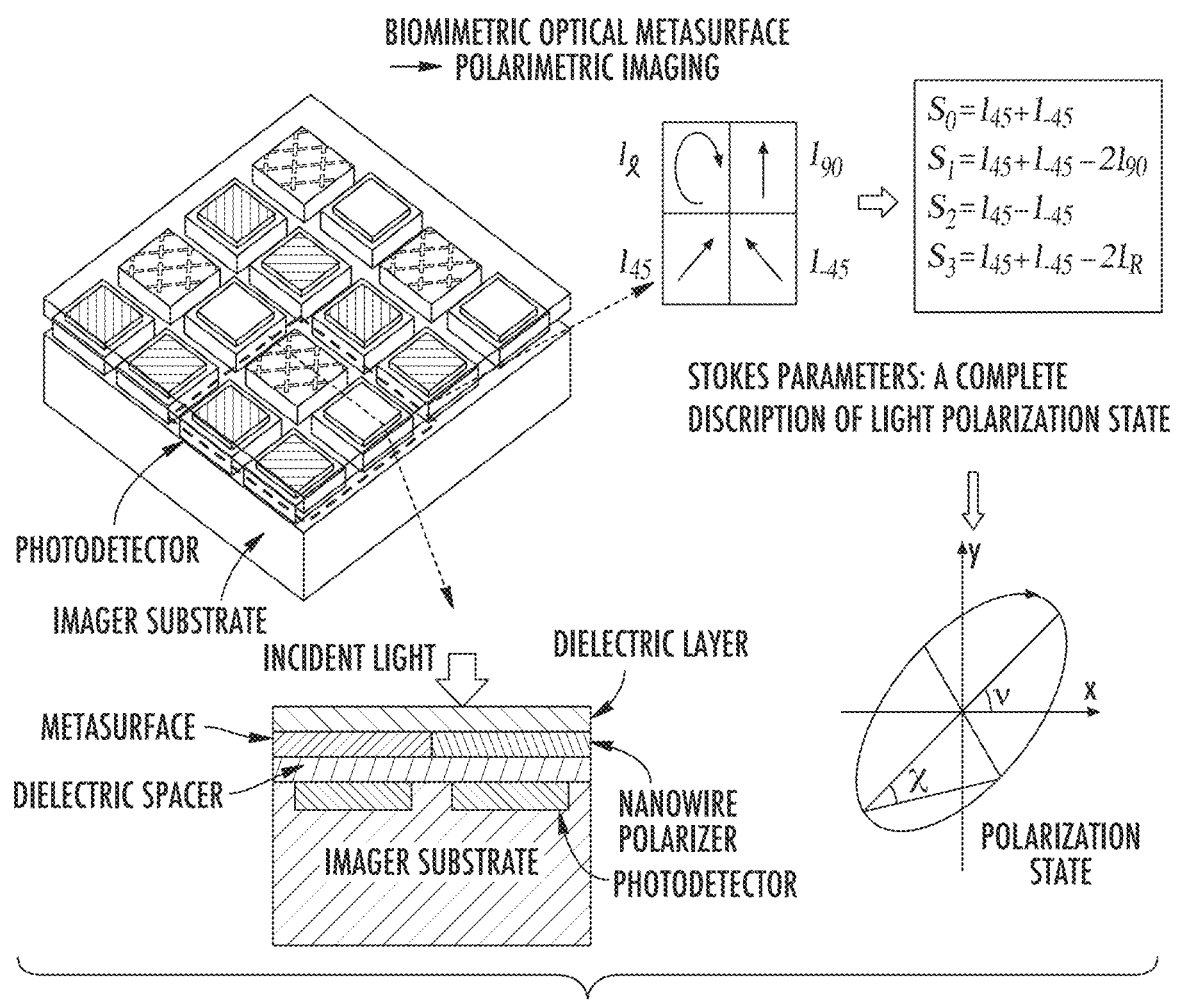
FIG. 11 is a schematic representation of a full polarization characterization sensor and method according to an inventive embodiment.

This concept of an integrated, on-chip polarization detector can be expanded to include not only L and R hand CPL detectors, but also linear polarization detectors. This allows for the construction of a thin, fast, 2D polarization detector array, with subpixels measuring data for direct calculation of the Stokes parameters, across an area—essentially a polarization camera. FIG. 11 is a schematic representation of just such an embodiment. In the embodiment of FIG. 11, multiple polarization filters are formed on a substrate (e.g., a semiconductor substrate) including integrated photodetection regions, i.e., sub-pixels. A unit cell, or complete polarization pixel, is made up of four components: one circular polarization sensor like the one depicted above, and three linear grating polarizers oriented at 45, negative 45 and 90 degrees relative to one another. These linear polarization subpixels may be fabricated as nanowire polarizers arranged on a dielectric spacer integrated (deposited on) the photosensitive substrate, i.e., the detector. As can be seen from FIG. 11, this arrangement allows for direct computation of the Stokes parameters from the intensities measured by the four individual polarization sensors. What is more, by expanding a unit cell of four polarization sensors across a 2D array, a 2-D polarization imager or camera may be realized.

Figure 12:
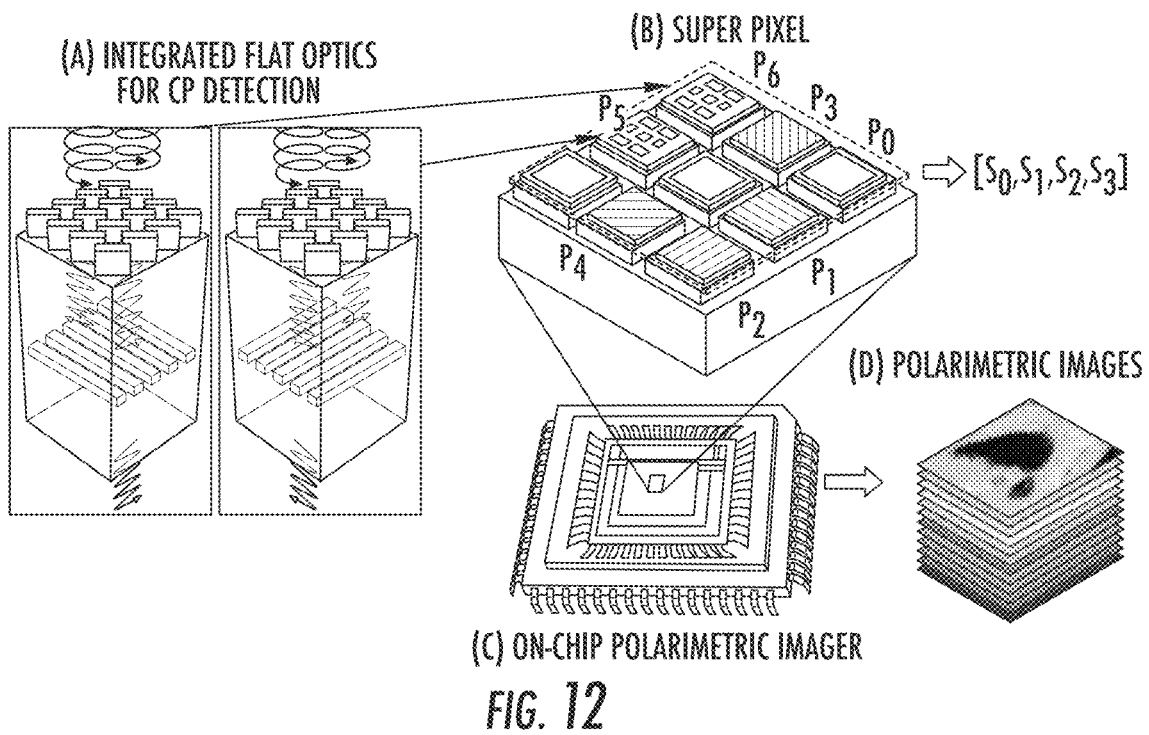
FIG. 12 is a schematic representation of an alternative full polarization characterization sensor and imager according to an inventive embodiment.

FIG. 12 shows an alternative polarization characterization sensor, which may achieve more accurate results than the polarization sensor described above with respect to FIG. 11. The sensor of FIG. 12 has a superpixel including two CPL sensing subpixels, one for RCP and one for LCP. Exemplary CPL sensors are described above with respect to FIGS. 1-3. Additionally, the superpixel has four linear polarization sensors at +/−90 and +/−45 degrees, relative to one another. All of the subpixels include individual photodetection elements (pixels) beneath each of the polarization filters. This arrangement results in six total polarization sensing elements, two for CPL and four for LPL. Additionally and optionally, these polarization sensing subpixels are integrated with polarization insensitive pixels. In the example of FIG. 12, there are three such subpixels. The polarization sensitive pixels enable direct calculation of the Stokes parameters of light incident on the sensor, and the overall device is a polarization sensitive camera on a chip, capable of directly generating polarimetric images. The operation of one such alternative sensor is discussed further in connection to FIG. 15

Figure 13:
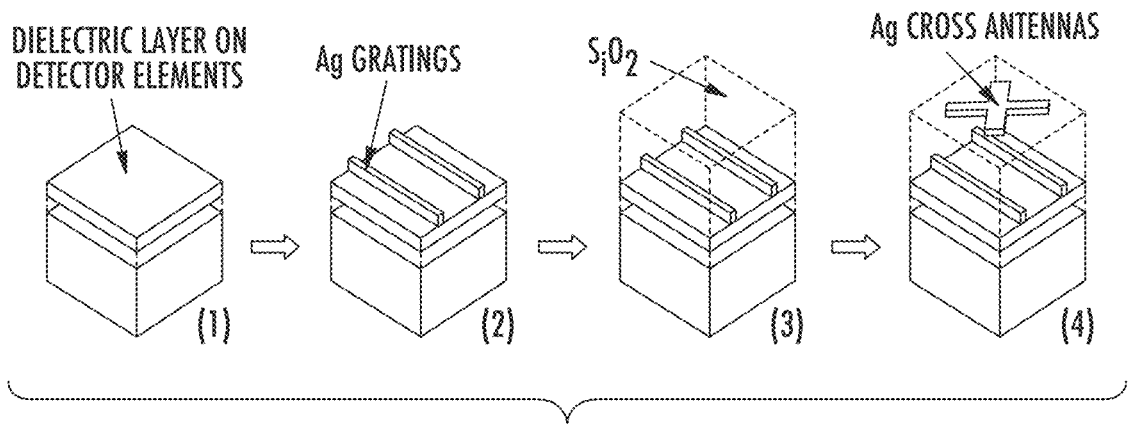
FIG. 13 schematically illustrates a method of fabricating an integrated polarization sensor according to an inventive embodiment.
Figure 14D:
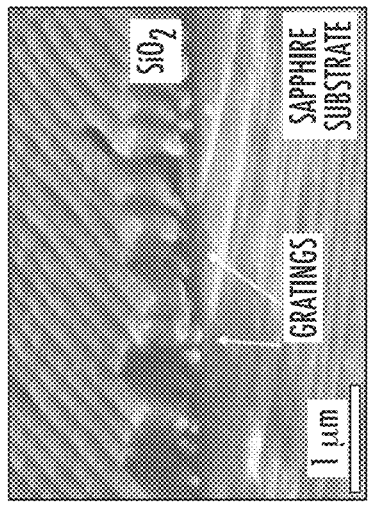
FIG. 14 schematically illustrates an alternative method of fabricating an integrated polarization sensor according to an inventive embodiment, and includes SEM images of the polarization sensors metasurfaces.
Figure 14E:
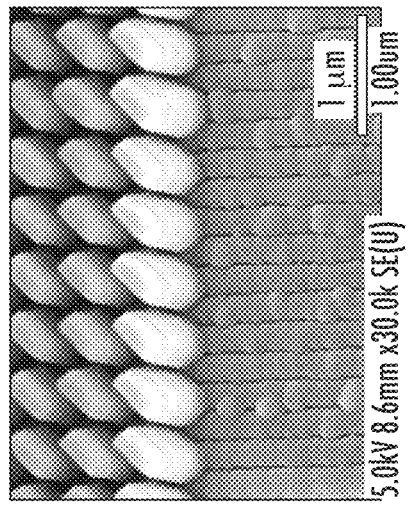
Figure 14A:
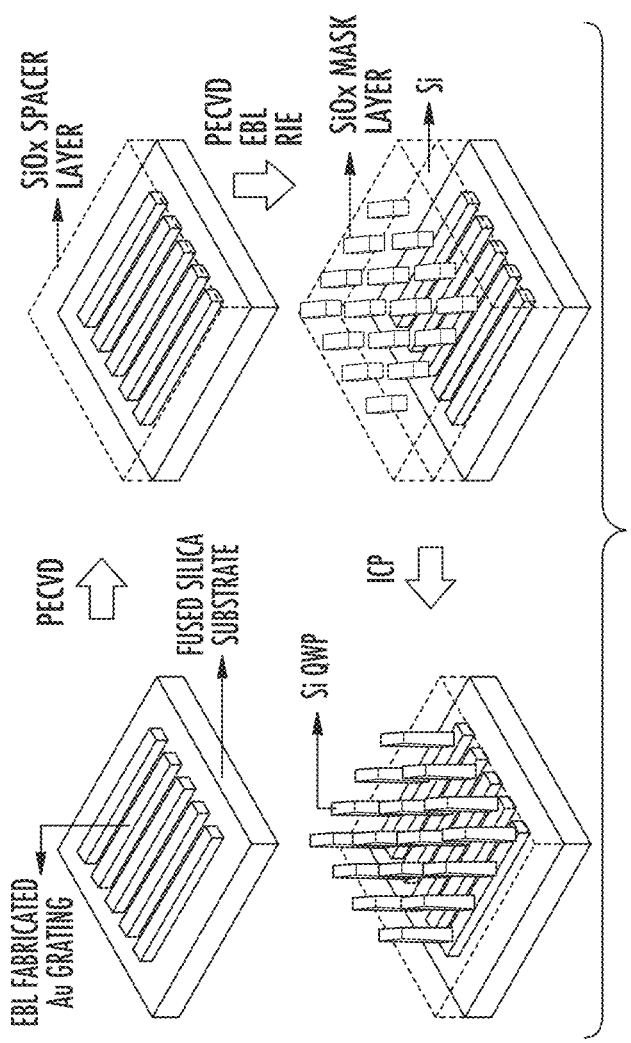
Figure 14C:
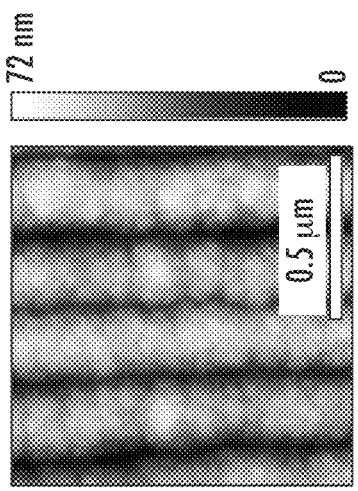
Figure 14B:
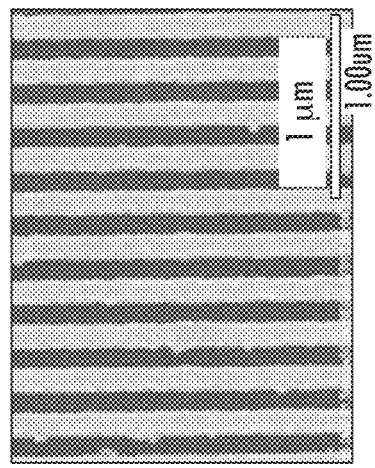
Figure 15A:
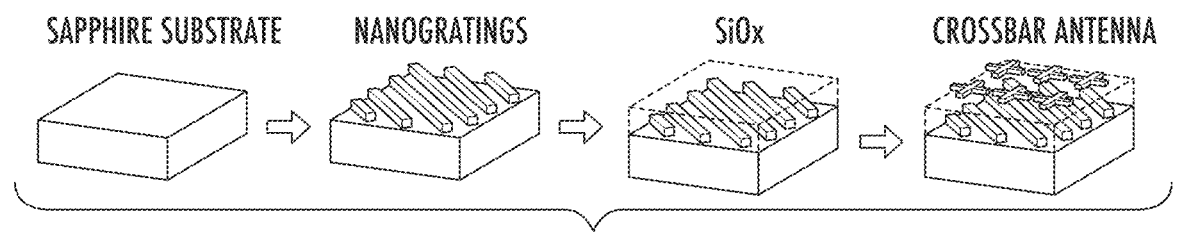
FIG. 15 schematically illustrates another alternative method of fabricating an integrated polarization sensor according to an inventive embodiment, and includes SEM images of the polarization sensors metasurfaces.
Figure 15B:
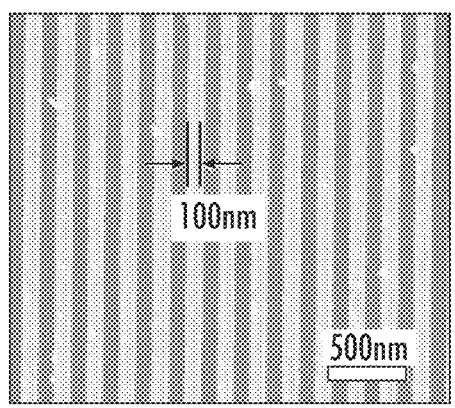
Figure 15C:
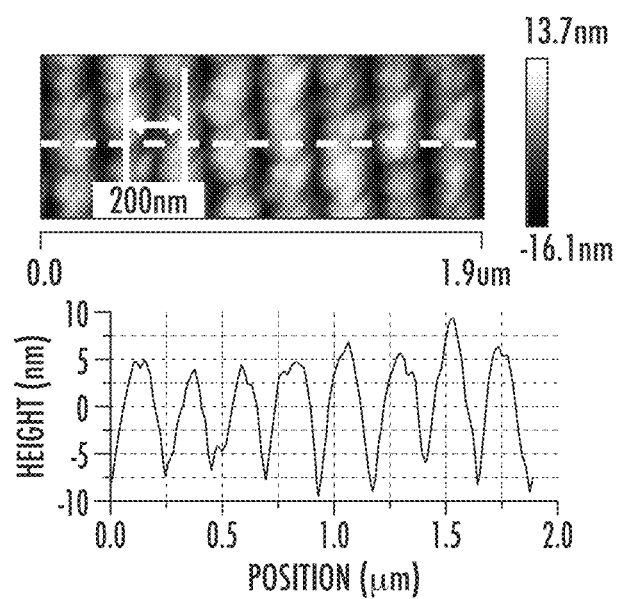
Figure 15D:
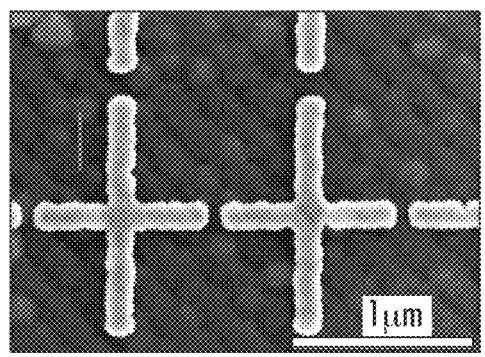
Figure 15E:
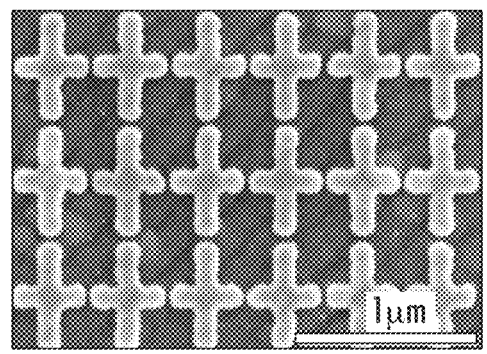

FIG. 13 shows a schematic method of fabricating a polarization sensor according to an embodiment of the invention. According to the method of FIG. 13, a doped and patterned substrate is provided having optical detector elements. The substrate is preferably a semiconductor selected to optically responsive at a predetermined wavelength of interest. The substrate has disposed thereon a dielectric layer (e.g., $SiO_2$). On top of the dielectric layer, a nanogrid linear polarizing grating is fabricated, which in one embodiment, is gold. Additional dielectric encapsulates the grating, e.g., $SiO_2$, and acts as a spacer. A quarter wave plate structure is deposited on top of the dielectric, which in the case of FIG. 13 is a gold cross-shaped optical antenna (a positive structure, rather than an aperture), which is fabricated by EBL or nanoimprint.

FIG. 14 shows the process steps for fabricating a CPL polarization filter according to inventive embodiment, for example, one of the CPL polarization filters described above with respect to FIGS. 1-3. According to the method of FIG. 14, a substrate is provided, e.g., a dielectric such as fused silica, a semiconductor or some other material such as sapphire. A linear polarizing nanograting is fabricated, e.g., by EBL, onto this substrate. An exemplary nanograting material is Au, but other materials such as Al are suitable. A dielectric spacer (e.g., $SiO_2$) is then deposited onto the nanograting layer by conventional processes such as PECVD. Next, a semiconductor or dielectric layer is formed on the spacer layer to the designed-for depth of the eventual quarter wave plate metasurface. In the example of FIG. 14, this layer is silicon. A patterned mask layer is deposited onto this silicon layer by conventional processes, and the silicon layer is then removed by etching to leave the silicon quarter wave plate microsurface. FIG. 14 also includes SEM images of the finished structures.

Similarly to FIG. 14, FIG. 15 shows example process steps for fabricating a CPL filter. However, FIG. 15 illustrates a device where the topmost element is an array of crossbar antennas, compared to the nanopillars shown in FIG. 14. FIG. 15 includes SEM and AFM images of the bottom nanograting, as well as SEM images of the crossbar antenna array. The structures shown in FIG. 15 were fabricated on sapphire substrates, which have a transmission cutoff wavelength around 5 μm longer than our designed operating wavelength. FIG. 15(a) shows the major fabrication steps. First, nanowire gratings with 200 nm period, 50% duty cycle and 120 nm thickness are patterned on the substrate with electron beam lithography (EBL), metal (Au) deposition and lift-off. FIG. 15(b) shows a SEM image of a portion of the fabricated nanogratings. Then a thin silicon oxide spacer layer (a few hundred nanometers) is deposited for two purposes: 1) to minimize near filed interaction between the plasmonic metasurface and nanograting polarizer and 2) to reduce surface fluctuation to facilitate the fabrication of plasmonic antennas. The surface of oxide-covered nanogratings is characterized with AFM and the results are shown in FIG. 15(c). The surface height modulation due to the existence of nanogratings underneath is reduced to less than 15 nm, which makes it possible for fabrication of cross-shape antennas (thickness ranging from 50 to 60 nm) on top. The cross-shape plasmonic antennas were fabricated directly on top of the oxide-covered gratings with EBL, followed by metal (Au) deposition and metal lift-off. FIGS. 15(d) and 15(e) show the SEM images of fabricated structures for CPL polarization filters operated around 3.8 μm and 1.5 μm, respectively. The fabrication process pictured will now be discussed in greater detail.

A double-side-polished sapphire substrate is cleaned using acetone, methanol, and an isopropanol rinse and an $O_2$ plasma cleaning. A 3 nm thick Cr is deposited by thermal evaporation at a rate of 0.2 nm/s onto the sapphire substrate as a conducting layer for electron beam lithography (EBL). Bi-layer PMMA is spin-coated onto the Cr layer and baked. Horizontal, vertical, 45° and −45°-oriented gold nanowire arrays (160 μm×160 μm each) and alignment markers are patterned onto the double-side-polished sapphire substrate with EBL and developed using MIBK/IPA (1:3) for 2 min, followed by an IPA rinse for 1 minute. Thermal evaporation of 120 nm Au/2 nm Cr at a rate of 0.2 nm/s and lift-off (overnight acetone soaking and sonication for 5 min) follows. Next, any PMMA residue is cleaned with $O_2$ plasma. The fabricated nanogratings are 100 nm wide with a 200 nm period and 120 nm thick. The conducting Cr layer is etched by dry etching. Then the sample surface is treated by solvent cleaning and Ar plasma cleaning. Next, 350 nm $SiO_x$ is sputtered onto the nanograting array while protecting the alignment markers by covering them with glass slides. After that, bilayer PMMA is spin coated onto the $SiO_x$ surface, and 6 nm Cr is deposited as a de-charging layer. Crossbar antenna arrays (160 μm square each) are fabricated on top of the nanograting arrays with the crosses rotated 45 degrees and −45 degrees relative to the nanograting by EBL using the same alignment mark. The conducting Cr layer is wet etched with Cr 4s etchant. After development, PMMA residue in the developed area is cleaned using $O_2$ plasma, followed by thermal deposition of 55 nm Au/2 nm Cr and lift-off. Finally, the PMMA residue for the whole sample area is cleaned with $O_2$ plasma.

FIG. 16 depicts an example polarization sensor as discussed previously in connection to FIG. 13. The proposed polarization detector design shown in panel (a) FIG. 15 is based on spatial division measurement scheme. The incident light is filtered with six spatially distributed micrometer-size polarization filters, i.e., $P_1$ to $P_6$, and the transmitted light are measured by photodetectors separately to obtain the polarized components. The LP filters ($P_1$, $P_2$, $P_3$ and $P_4$) are simply nanowire gratings in four different directions, i.e. 0 degree ($P_1$), 90 degree ($P_2$), 45 degree-oriented ($P_3$) and −45 degree-oriented ($P_4$). The two circular polarization filters ($P_5$ and $P_6$) transmit only right circular polarization (RCP) and left circular polarization (LCP) light, respectively. Denoting the measured LP components of input light by $P_1$, $P_2$, $P_3$ and $P_4$ as $I_1$, $I_2$, $I_3$ and $I_4$, and those of the CP components by $P_5$ and $P_6$ as $I_5$ and $I_6$, we can calculate the Stokes parameters ($S_0$, $S_1$, $S_2$, $S_3$) of the input light as follows:

$$\begin{cases} S_0 = I_0 \\ S_1 = I_2 - I_1 \\ S_2 = I_4 - I_3 \\ S_3 = I_6 - I_4 \end{cases}$$

The total light power density to is obtained via an empty cell ($P_0$) without any filters. Note all the filters and the empty cells have the same area. This design can be used to detect arbitrary light polarization state, including partially polarized light. The total polarization intensity is defined as $I_P^2 = S_1^2 + S_2^2 + S_3^2$. For polarized light, $I_P^2 = I_0^2$ while for partially polarized light, $I_P^2 < I_0^2$. To perform complete measurement of the arbitrary polarization state with high accuracy, one needs to realize these six polarization filters with high extinction ratio. In the following, we will present the design and experimental demonstration of individual polarization filters, followed by overall performance characterization of the whole structure.

FIG. 16(a) is a schematic of an example detector as discussed previously. FIG. 16(b) shows a schematic of an RCP detector pixel and FIG. 16(d) shows a schematic of an LCP detector pixel. In FIGS. 16(c) and 16(e), the black (red) curves represent LCP (RCP). For the RCP filter, the arms of the cross-shaped antennas are oriented along x and y axes and the nanowire gratings are oriented along −45° (FIG. 16(b)) with respect to x axis. The input RCP (LCP) light are first converted by the plasmonic metasurface to LPL oriented at an angle of 45° (−45°) with respect to the x-axis, which is then transmitted (blocked) by the −45° oriented nanogratings, as illustrated in FIG. 16(c). For the LCP filter, the plasmonic metasurface remains the same but the grating polarizer is oriented at 45° angle with respect to x-axis. Thus it transmits LCP light while blocking RCP light. To achieve accurate polarization measurement, it is critical to have high CPL extinction ratio, i.e., the ratio of transmission for LCP and RCP light (defined as $r_{CP} = T_{RCP}/T_{LCP}$ ($T_{LCP}/T_{RCP}$) for RCP (RCP) polarization filters). A high CPL extinction ratio relies on a high CP-to-LP conversion efficiency ($\eta = DOLP_{output}$, assuming CPL input) of the metasurface quarter-waveplate and a high LP extinction ratio of the nanograting linear polarizer, $r_{LP}$. Unlike conventional polarization detectors requiring bulky and complex systems, our design can be fabricated monolithically on one single chip, Particularly, both the grating polarizer and plasmonic metasurface can be made in subwavelength thickness (less than 200 nm).

Figure 17A:
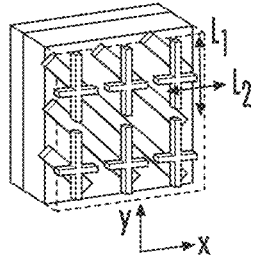
FIG. 17 illustrates performance characteristics of polarization filtering elements of an integrated polarization sensor according to an inventive embodiment.
Figure 17B:
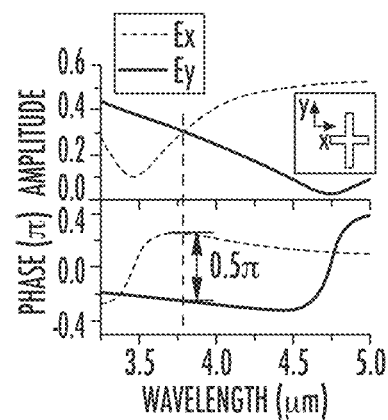
Figure 17C:
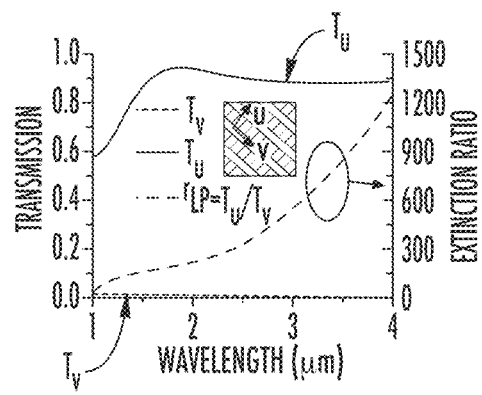
Figure 17D:
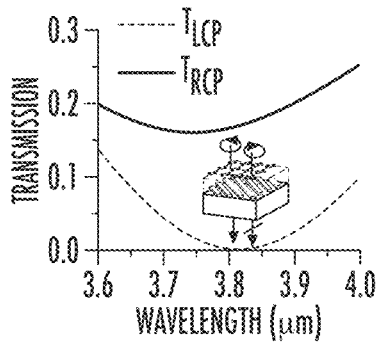

The RCP and LCP polarization filters, as illustrated in FIG. 16, are composed of vertically integrated plasmonic metasurfaces and nanogratings. FIG. 17(a) shows a front-view of a portion of the RCP polarization filters and the corresponding transmission coefficients for RCP and LCP incident light for an example sensor such as that shown in FIG. 16. FIG. 17(b) shows the amplitude and phase of electric fields along 2 orthogonal arms in a cross bar. FIG. 17(c) shows a schematic nanograting along with transmission for polarizations parallel and perpendicular to the grating axis, together with the extinction ratio as a function of wavelength. FIG. 17(d) shows overall transmission spectra for LCP and RCP.

The plasmonic metasurface quarter-waveplate is composed of cross-shape antennas. To introduce controllable anisotropic optical response, we design the cross-shape antennas to have two arms with different lengths ($L_1 > L_2$) along x and y axes to generate different optical response for incident electric fields oriented along the two axes ($E_x$ and $E_y$). The transmission coefficients and phase shifts introduced to Ex and Ey were obtained with full wave simulation and shown in FIG. 17(b). The resonance 'dips' in the transmission curves correspond to the antenna resonances resulted from the two arms of the cross-shape antenna. By engineering the antenna arm lengths and periodicity, we have been able to achieve equal transmission and a π/2 phase difference between Ex and Ey at an operation wavelength of 3.8 μm (FIG. 17(b)). The nanograting polarizers are designed to provide high extinction ratio for LPL, i.e., $rLP = T_u/T_v$, which is the ratio between the transmission coefficients of input LPL with electric field oriented along u and v axes, as indicated in the inset of FIG. 17(c)). Full wave simulation results of the grating transmission and extinction ratio for a design with 200 nm period, 50% duty cycle and 120 nm film thickness are shown in FIG. 2c. The extinction ratio increases as wavelength becomes longer and reaches over 1000 at wavelengths close to 4 μm. The transmission of selected LPL ($T_u$) is about 90% for wavelength longer than 1.5 µm. Theoretical analysis shows that the extinction ratio can be further improved by increasing the thickness of the nanograting, which is ultimately limited by the feasibility of fabricating structures with low defects density and good uniformity.

Figure 17E:
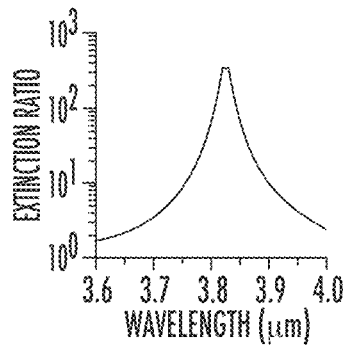
Figure 17F:
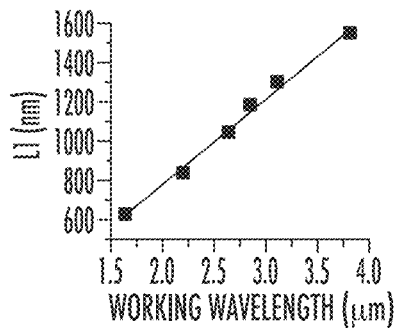

As shown in FIG. 17(e), an extinction ratio for CP light ($r_{CP}=T_{RCP}/T_{LCP}$) of up to $10^3$ around wavelength 3.8 µm has been achieved in a structure designed to operate at infrared wavelengths. The transmission for the selected polarization is about 20%, i.e., −7 dB. The device can be operated over a wavelength range of about 200 nm providing an extinction ratio of over 10 (10 dB). Moreover, the operation wavelength of the CP detection units can be tuned by changing the geometric parameters of the structure. FIG. 17(f) shows the tuning of optimal operational wavelengths from 1.5 µm to 4 µm as a function of the longer arm length in the cross-shape antenna ($L_1$).

Figure 18A:
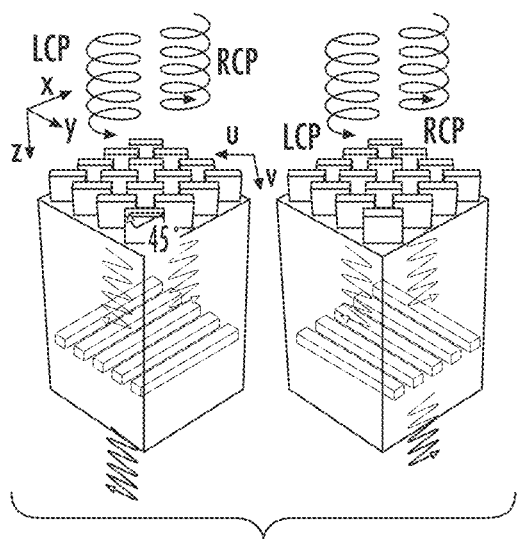
FIG. 18 illustrates performance characteristics of alternative polarization filtering elements of an integrated polarization sensor according to an inventive embodiment.
Figure 18B:
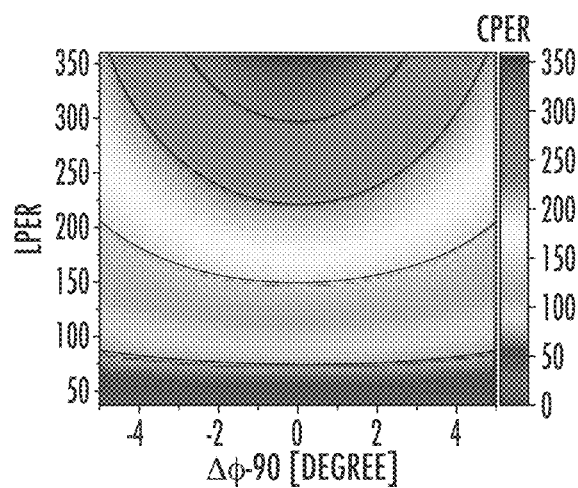

As discussed above, the performance of various embodiments can be tuned to tailor performance characteristics and operating wavelength ranges. FIG. 18 shows the relationship between the phase difference between the fast and slow optical axes in nanopillars structures, the linear polarization extinction ratio of the underlying nanograting, and the resulting circular polarization extinction ratio of a combined device.

To reveal the major design criteria, we have set up a simplified model of the based on Jones matrices (see method section or supplementary information) and obtained the transmission coefficients of left-handed and right handed circularly polarized light. When $$LCP = \frac{\sqrt{2}}{2}\begin{bmatrix}1\\i\end{bmatrix} \text{ and } RCP = \frac{\sqrt{2}}{2}\begin{bmatrix}1\\-i\end{bmatrix},$$

we have:

$$T_{LCP} = \left|t_x\left(\gamma_f \cos\frac{\Delta\varphi}{2} + \gamma_s \sin\frac{\Delta\varphi}{2}\right) + t_y\left(i\gamma_f \sin\frac{\Delta\varphi}{2} - i\gamma_s \cos\frac{\Delta\varphi}{2}\right)\right|^2 \text{ and } T_{RCP} =$$

$$\left|t_x\left(\gamma_f \cos\frac{\Delta\varphi}{2} - \gamma_s \sin\frac{\Delta\varphi}{2}\right) + t_y\left(i\gamma_f \sin\frac{\Delta\varphi}{2} + i\gamma_s \cos\frac{\Delta\varphi}{2}\right)\right|^2$$

where $\Delta\varphi$ is the phase difference introduced by the quarter-wave plate (QWP) with its fast axis is oriented 45° with respect to x-axis. $\gamma_f$ and $\gamma_s$ are transmission coefficients for electric field components along the fast and slow axes, respectively. $t_x$ and $t_y$ are transmission coefficients of the gratings for electric field components along x and y axes. The calculated dependence of the circular polarization extinction ratio (CPER) on different design parameters and conclude that to achieve a large CPER, one needs to maximize the linear polarization extinction ratio (LPER) and design a perfect QWP with $\Delta\varphi=\pi/2$.

The nanopillar-based device discussed in this example and its performance is illustrated in FIG. 19. FIG. 19(a) is a schematic of a silicon quarter waveplate. U and V are the axes corresponding to long and short axes of nanopillars. FIG. 19(b) shows the nearfield electric field distribution in the middle of metasurface when the incident polarization is along the length (top) and width (bottom) of unit cells. FIG. 19(c) Phase delay difference between U and V axes (left axis), as well as corresponding transmission along V (red), U (green) and total transmission (black, right axis). FIG. 19(d) shows transmission through the gold nanograting immersed in silicon oxide (left axis), and its linear polarization extinction ratio (right axis). FIG. 19(e) shows transmission (left) and CPER (right) of integrated device. Finally, FIG. 19(f) shows wavelength tuning of device by sweeping the length of silicon nanopillars (and hence the aspect ratio), while keeping all the other parameters fixed.

For the structure shown in FIG. 19(a), we choose dielectric metasurface composed of silicon nanopillars with geometrically induced birefringence to realize QWPs with accurate phase retardation control and high transmission efficiency. The Si nanopillars are designed with subwavelength dimensions (length 483 nm, width 160 nm, height 700 nm) to avoid Mie-resonance. The birefringence of the silicon nanopillar array results from the distinct near field distributions for different incident light polarization, as illustrated in FIG. 19(b). For incident LP light polarized along the fast axis (u-axis) of metasurface QWP, the electric field intensity is mostly localized in the silicon medium (top panel in FIG. 19(b)). In contrast, for incident light polarized along the slow axis of the metasurface QWP, the electric field intensity is mostly located in the air gaps between Si pillars (bottom panel in FIG. 19(b)). As a result, the phase difference introduced to the two orthogonal electric field components along the fast and slow axes can be precisely engineered by varying the metasurface geometry to any value, e.g. at $0.57\pi$ at 1.54 µm as shown in FIG. 2c. Additionally, the metasurface QWP has equally high transmission coefficients for both field components, with a total transmission efficiency over 90% in the infrared range (>90%). Moreover, the operation wavelength $\lambda_0$ can be flexibly tailored by engineering the metasurface dimensions, including the pillar height, length-to-width aspect ratio (LWAR) and the silicon volume filling factor (VFF) (see supplementary information FIG. S2 for more details). To achieve a linear polarizer with high LPER, we have designed gold nanowire grating polarizers (period 230 nm, duty cycle 36% and thickness 195 nm) with an LPER of ~400 and transmission efficiency >90% for the selected polarization state in from 1 to 2 µm wavelength range (FIG. 19(d)). To provide accurate analysis of the performance of the proposed CPL filters, we performed full wave simulation of the integrated structures and obtained their transmission spectra for LCP and RCP incident light, respectively. FIGS. 19(c) through 19(f) shows the results for an LCP filter. Its maximum CPL extinction ratio (CPER) reaches over 400 with transmission efficiency over 90% at an optimal wavelength of $\lambda_0$~11.47 µm. Such a structure can be operated over a wavelength range of more than 100 nm (from 1.45 to 1.55 µm) with CPER over 30 and transmission efficiency over 80%, which clearly indicates that the designs are feasible for broadband CPL discrimination. Furthermore, we have also demonstrated a broad tuning range of $\lambda_0$ from 1.1 to 1.65 µm by simply varying the lateral dimensions of metasurface design without varying film thickness, as shown in FIG. 19(f). Such engineering flexibility greatly enables on-chip wavelength multiplexing of CPL filters for broadband wavelength operation.

Figure 20A:
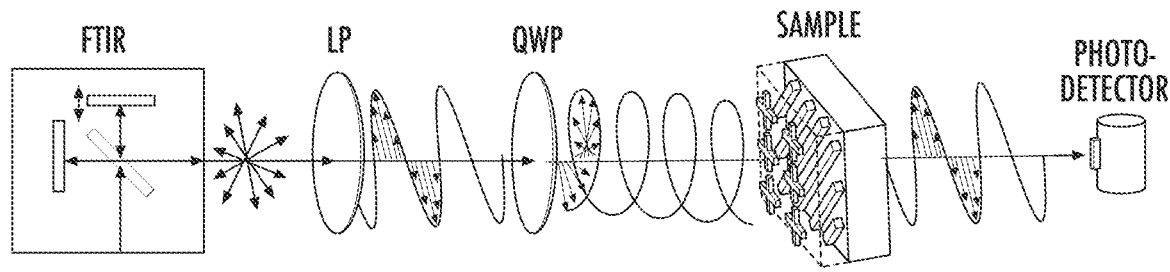
FIG. 20 schematically illustrates experimental measurements performed on polarization filtering elements of an integrated polarization sensor according to an inventive embodiment and also includes measurement results.
Figure 20B:
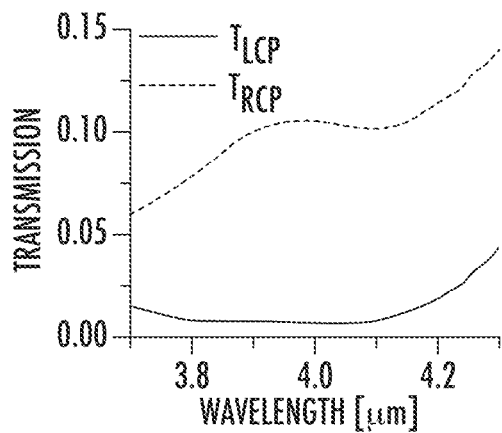
Figure 20C:
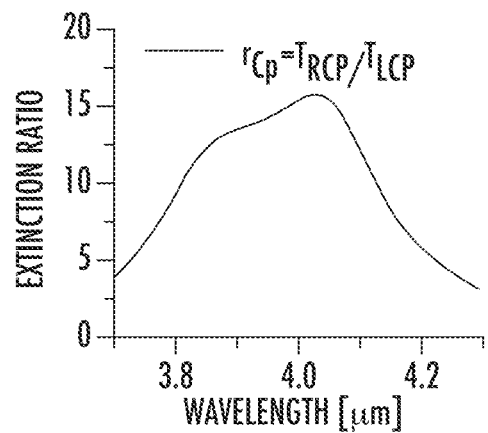
Figure 20D:
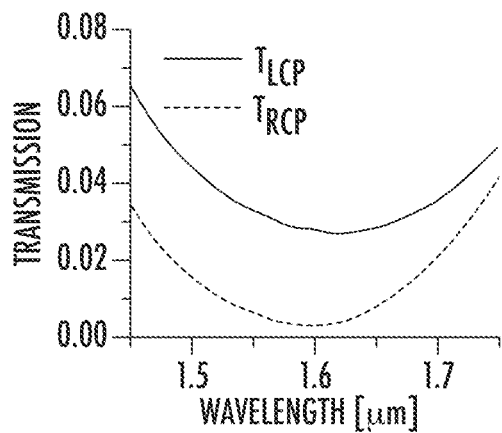
Figure 20E:
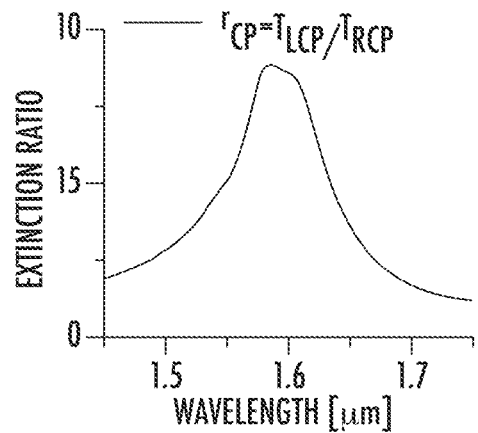

Performance of various embodiments of the disclosures herein have been validated by experiments, some of which will now be discussed. FIG. 20 illustrates the validation of transmission and extinction ratios for RCP and LCP for the device structure of FIG. 19. FIG. 20(a) is a schematic of the measurement setup. Unpolarized light is converted to CPL with a linear polarizer and a quarter-wave plate. The handedness of CPL can be controlled by adjusting the angle between the axes of the polarizer and the quarter-wave plate to 45 degrees or −45 degrees. The CPL passes through the CPL filter and is incident on a photodetector. The electrical signal generated at the photodetector is then sent back to an FTIR spectrometer to measure the intensity of transmitted light at different wavelengths. The measured transmission spectra for LCP and RCP light and corresponding extinction ratio of the RCP filter in the mid-infrared are shown in FIGS. 20(b) and 20(c), respectively. The device exhibits a maximal extinction ratio of 16 around 4 μm and a 3 dB bandwidth of about 400 nm (from 3.78 μm to 4.18 μm). FIG. 20(b) also shows the transmission coefficient of the desired handedness, i.e., RCP, is about 10%. The lower transmission efficiency is likely due to higher loss introduced in the plasmonic antennas due to surface roughness. We have also demonstrated devices operated for near infrared wavelengths on the same substrate. FIGS. 20(d) and 20(e) respectively show measured transmission spectra for LCP and RCP light and corresponding extinction ratio of a RCP filter designed around 1.6 μm (near infrared). A maximum extinction ratio up to 9 has been demonstrated with a 3 dB bandwidth of about 100 nm (from 1.55 μm to 1.65 μm). We attribute the lower extinction ratio than simulated results to the difference in geometries (cross-antenna arm lengths, thickness, etc.) and material properties (indices of the metal and spacer layers) between simulation and experiments. Improved performance is expected when device parameters are optimized according to methods disclosed elsewhere in this Application.

FIG. 21 illustrates experimental validation of end-to-end polarization sensor incorporating CPL filters such as those discussed in connection with FIG. 16 and elsewhere. FIG. 21(a) shows a schematic of the design, including four linear polarization filters and two circular polarization filters. The linear polarization filters ($P_1$, $P_2$, $P_3$, and $P_4$) are nanowire gratings oriented along four different directions: horizontal, vertical, 45 degrees, and −45 degrees. The two circular polarization filters, $P_5$ and $P_6$, selectively transmit only RCP and LCP light, respectively. The incident light is filtered by the six spatially distributed micrometer-size polarization filters, i.e., $P_1$ to $P_6$, and the transmitted light are measured by photodetectors separately to obtain the polarized components. The LP components of input light measured by $P_1$, $P_2$, $P_3$, and $P_4$ are denoted by $I_1$, $I_2$, $I_3$ and $I_4$, respectively. The CP components of light measured by $P_5$ and $P_6$ are denoted by $I_5$ and $I_6$. The Stokes parameters ($S_0$, $S_1$, $S_2$, $S_3$), of the input light are then calculated as described above in connection with FIG. 16.

In order to perform the measurements described above, broadband unpolarized light is transmitted through a linear polarizer and quarter-wave plate. An arbitrary polarization state can be generated by rotating the linear polarizer and wave plate. A mid-IR objective is used to focus light onto the sample, which is placed on a motorized stage. The light passes through the sample and is collected by another mid-IR objective. An aperture is placed at the image plane to select the region on the sample to measure. Such a scanning imaging system allows us to characterize light transmitting through all six filters by controlling lateral displacement of the motorized stage without changing anything else in the setup. As illustrated in FIG. 21(a), the transmitted light through all six filters ($I_1$ to $I_6$) and an empty cell ($I_0$) are measured to calculate the Stokes parameters of light for a known polarization state generated using the linear polarizer and quarter waveplate. A reference polarization measurement of the input light is made by removing the sample and replacing it with a standard rotating polarization analyzer.

A comparison of the Stokes parameters ($S_0$, $S_1$, $S_2$, $S_3$) obtained by the on-chip polarimeter and a rotating polarization analyzer is presented in FIG. 21(c) for nine arbitrarily-chosen polarization states. The Stokes parameter measurement results from our sample are consistent with results from the polarization analyzer. The average error of $S_1$, $S_2$, $S_3$ measured from experiments is 0.035, 0.025, and 0.104, respectively. The average measurement error is 3.6% for DOLP and is 10% for DOCP. To illustrate the results more intuitively, FIG. 21(b) compares polarization ellipse plots for four polarization states. The measured results obtained with the on-chip polarimeter (red curve) show good consistency with those obtained from the polarization analyzer (black dots). Notably, the on-chip polarimeter can be used to determine the handedness of the light (indicated by the blue arrows shown), which cannot be determined by measurements taken with the rotating polarizer.

For the avoidance of doubt, aspects of the present disclosure described with respect to the systems are applicable to the methods and aspects described with respect to the methods are applicable to the systems.

It will be appreciated by those skilled in the art that while the invention has been described above in connection with particular embodiments/aspects and examples, the invention is not necessarily so limited, and that numerous other embodiments, examples, uses, modifications and departures from the embodiments, examples and uses are intended to be encompassed by the claims attached hereto.

The invention claimed is:

1. A method of manufacturing a polarization sensor, comprising:
fabricating a linear polarizing nanograting layer onto a substrate comprising at least one optical detector element;
depositing a dielectric spacer layer onto the nanograting layer;
forming a semiconductor or dielectric mask layer onto the spacer layer;
depositing a patterned mask layer onto the mask layer; and
etching the mask layer provide a quarter wave plate metasurface.

2. The method of manufacturing a polarization sensor of claim 1, wherein the linear polarizing nanograting is fabricated using electron beam lithography (EBL).

3. The method of manufacturing a polarization sensor of claim 1, wherein the substrate comprises a dielectric material.

4. The method of manufacturing a polarization sensor of claim 1, wherein the substrate comprises fused silica, a semiconductor or sapphire.

5. The method of manufacturing a polarization sensor of claim 1, wherein the dielectric spacer layer comprises silica.

6. The method of manufacturing a polarization sensor of claim 1, wherein the depositing a dielectric spacer layer onto the nanograting layer is done by plasma enhanced chemical vapor deposition (PECVD).

7. The method of manufacturing a polarization sensor of claim 1, wherein the mask layer comprises silicon.

8. The method of manufacturing a polarization sensor of claim 1, wherein the metasurface comprises an array of pillars disposed on the spacer, wherein each of the pillars is spaced apart and separated by a gap from adjacent pillars and each of the pillars comprises a high index of refraction material, wherein the orientation of the nanograting relative to the array of pillars blocks an incident light having a circular polarization state and passes incident light having an opposite circular polarization state.

9. The method of manufacturing a polarization sensor of claim 8, wherein each of the pillars comprises an anisotropic cross-sectional shape and comprises dimensions to create $\pi/2$ phase lag between electric field components of the incident light.

10. The method of manufacturing a polarization sensor of claim 1, wherein the linear polarizing nanograting comprises gold.

11. The method of manufacturing a polarization sensor of claim 1, wherein the linear polarizing nanograting comprises a 200 nm period and 120 nm thickness.

12. The method of manufacturing a polarization sensor of claim 1, wherein the quarter wave plate metasurface comprises one or more cross-shaped antennas.

\* \* \* \* \*